(12) United States Patent
Alles

(10) Patent No.: US 8,311,754 B2
(45) Date of Patent: Nov. 13, 2012

(54) POWER MONITORING AND ANALYSIS SYSTEM FOR IDENTIFYING AND TRACKING INDIVIDUAL ELECTRICAL DEVICES

(75) Inventor: Harold Gene Alles, Lake Oswego, OR (US)

(73) Assignee: Home Comfort Zones, Beaverton, OR (US)

( * ) Notice: Subject to any disclaimer, the term of this patent is extended or adjusted under 35 U.S.C. 154(b) by 329 days.

(21) Appl. No.: 12/635,010

(22) Filed: Dec. 10, 2009

(65) Prior Publication Data

US 2011/0144932 A1    Jun. 16, 2011

(51) Int. Cl.
  *G01R 21/00* (2006.01)
  *G01R 15/00* (2006.01)
(52) U.S. Cl. .......................................... 702/61; 702/57
(58) Field of Classification Search .................. 702/61, 702/57
  See application file for complete search history.

(56) References Cited

U.S. PATENT DOCUMENTS

| | | | |
|---|---|---|---|
| 4,858,141 | A | 8/1989 | Hart et al. |
| 5,289,362 | A | 2/1994 | Liebl et al. |
| 5,483,153 | A | 1/1996 | Leeb et al. |
| 6,891,838 | B1 * | 5/2005 | Petite et al. ............... 370/401 |
| 6,906,617 | B1 | 6/2005 | Van der Meulen |
| 7,174,260 | B2 | 2/2007 | Tuff et al. |
| 7,246,014 | B2 | 7/2007 | Forth et al. |
| 2008/0195894 | A1 * | 8/2008 | Schreck et al. ............ 714/34 |
| 2010/0191487 | A1 * | 7/2010 | Rada et al. ............... 702/60 |

OTHER PUBLICATIONS

Albert, Adrian, "Disaggregation: Brief Survey, Disaggregation: a Survey, Stanford University", 2010, Whole Document.
Armel, "Energy Disaggregation, Precourt Energy Efficiency Center, Stanford University, May 2010", Whole Document.
EPRS, "Low-Cost NIALMS Technology, Market Issues & Product Assessment, TR-108918-V1, Electric Power Reasearch Institute", (Sep. 1997), 70 pgs.
Hart, "Nonintrusive Appliance Load Monitoring, IEEE, 0018-9219/92/1200-1485, IEEE 1992", (Dec. 1992), 1870-1891.
Phiala, Hannu , "Non-Intrusive appliance load monitoring system based on a modern kWh-meter, VTT Enery, VTT Publications 356, Technical Research Centre of Finland ESPOO 1998", 71 pgs.
Venrock, "Disaggregation: One VC's View, May 28, 2010", Whole Document.

* cited by examiner

*Primary Examiner* — Michael Nghiem
*Assistant Examiner* — Manuel Rivera Vargas
(74) *Attorney, Agent, or Firm* — Marger Johnson & McCollom, P.C.

(57) ABSTRACT

Methods and mechanisms for processing a plurality of electrical parameters of a common alternating current service that supplies power for multiple electrical devices. In an embodiment, an instance data structure is identified based on a data set which is generated from samples of an alternating current service, the instance data structure corresponding to an on-off cycle of an electrical device. Based on the instance data structure, a contribution by the on-off cycle is subtracted from the data set to determine a residual data set. In another embodiment, the residual data set is processed to determine whether the residual data set includes a contribution by an on-off cycle of another electrical device.

16 Claims, 17 Drawing Sheets

700

701

| Service leg | A | State A | 1 | Voltage before turn on | 119.0 |
| Turn on time | 312-1:23:17 | On-off state | off | Voltage after turn on | 119.0 |
| Turn off time | 312-1:32:20 | Start SCE count | 0 | Voltage before turn off | 119.1 |
| Associated device | | Middle SCE count | 2 | Voltage after turn off | 119.1 |
| Association confidence | | | | Measurement confidence | 1.00 |

720  721  722  723

| Real power | | |
|---|---|---|
| Start | | |
| PS-duration | 63 | |
| PS1(t, v) | 0 | 478 |
| PS2(t, v) | 1 | 1494 |
| PS3(t, v) | 14 | 1412 |
| PS4(t, v) | 2 | 1339 |
| PS5(t, v) | 2 | 1221 |
| PS6(t, v) | 1 | 1149 |
| PS7(t, v) | 1 | 1083 |
| PS8(t, v) | 1 | 1036 |
| PS9(t, v) | 4 | 992 |
| PS10(t, v) | 5 | 946 |
| PS11(t, v) | 2 | 904 |
| PS12(t, v) | 1 | 867 |
| PS13(t, v) | 1 | 811 |
| PS14(t, v) | 1 | 704 |
| PS15(t, v) | 1 | 523 |
| PS16(t, v) | 1 | 354 |
| PS17(t, v) | 1 | 255 |
| PS18(t, v) | 1 | 216 |
| PS19(t, v) | 1 | 197 |
| PS20(t, v) | 1 | 176 |
| PS21(t, v) | 1 | 159 |
| PS22(t, v) | 1 | 150 |
| PS23(t, v) | 2 | 142 |
| PS24(t, v) | 2 | 130 |
| PS25(t, v) | 2 | 124 |
| PS26(t, v) | 4 | 119 |
| PS27(t, v) | 3 | 114 |
| PS28(t, v) | 6 | 108 |

| Middle | | |
|---|---|---|
| PM-minimum-v | 100 | |
| PM-average-v | 103 | |
| PM-maximum-v | 122 | |
| PM-duration | 543 | |
| PM-period | 0 | |
| PM1(t, v) | 0 | 108 |
| PM2(t, v) | 133 | 113 |
| PM3(t, v) | 36 | 117 |
| PM4(t, v) | 292 | 122 |
| PM5(t, v) | 940 | 117 |
| PM6(t, v) | 709 | 113 |
| PM7(t, v) | 953 | 108 |
| PM8(t, v) | 549 | 105 |
| PM9(t, v) | 3009 | 100 |
| PM10(t, v) | 25907 | 100 |

| End | | |
|---|---|---|
| PE1(t, v) | 0 | 100 |
| PE2(t, v) | 1 | 48 |
| PE3(t, v) | 1 | 0 |

Report name
Consumer name
Components (D1, D2, D3, ...)
On-off state
Device count
Number of cycles
Run time
Power use rate
Total power used
Devcie power
Power cost rate
Total power cost

| Start Date | Start Time | Cost-One | Tier-Two | Cost-Two | ... |
|---|---|---|---|---|---|
| S-Date1<br>S-Date2<br>... | S-Time 1<br>S-Time 2<br>... | Cost-One1<br>Cost-One2<br>... | Teir-Two1<br>Teir-Two2<br>... | Cost-Two1<br>Cost-Two2<br>... | ...<br>...<br>... |

START DATE  4/20/2009      START TIME        12:00:00AM

END DATE    PRESENT        END TIME          7:12:14PM

TOTAL POWER (KWH)  1052.10     TOTAL $    $105.21

PRESENT RATE (W)     6353       $/HR       $0.635

IDENTIFY        GROUP           RATES

| DEVICE | ON/OFF | POWER (W) | $/HR | TOTAL TIME | TOTAL $ |
|---|---|---|---|---|---|
| UNKNOWN | | 360 | $0.036 | 15:19:12:14 | $55.12 |
| A/C | | 4952 | $0.495 | 28:42:30 | $14.21 |
| CLOTHS DRYER | | 3134 | $0.313 | 8:17:29 | $ 2.60 |
| OVEN | | 3099 | $0.310 | 0:46:13 | $ 0.24 |
| 1469W HEATER | | 1469 | $0.147 | 2:12:44 | $ 0.32 |
| COMPUTER | | 243 | $0.024 | 71:22:28 | $17.34 |
| 225W FAN MOTOR | | 225 | $0.025 | 13:52:16 | $ 3.12 |
| KITCHEN LIGHTS | | 193 | $0.019 | 42:10:20 | $ 0.81 |
| FAMILY RM LIGHTS | | 170 | $0.017 | 63:33:31 | $ 1.08 |
| 60W I-LIGHT (2) | | 120 | $0.012 | 19:05:45 | $ 0.23 |

GO TO NEXT PAGE

FIG. 15

POWER MONITORING AND ANALYSIS SYSTEM FOR IDENTIFYING AND TRACKING INDIVIDUAL ELECTRICAL DEVICES

BACKGROUND OF THE INVENTION

1. Technical Field of the Invention

This invention relates generally to energy monitoring systems and more specifically to electrical power monitors as used in residential energy management systems.

2. Background Art

There is a broad growing interest in energy conservation. Reducing residential electrical consumption is a priority for national, state, and local governments, for utilities, and for consumers. It is especially important to reduce electrical consumption during peak load periods, typically in the afternoon on hot days. It is generally accepted that consumers are more likely to change their behavior if they are made aware of where, when, and how they use electricity in their household and how much it costs. A power monitoring system provides this information.

The simplest monitor displays the present rate of power use. Its function is similar to the power meter used by the utility company for billing, but it displays the information in a format and location that this more convenient for consumers. The power can be displayed in units of electricity (kilowatts) or in units of cost ($x.xx per hour). The display can be portable or located in a convenient place in the home. This type of monitor can make the consumer aware of the total cost of the electricity used by the household at the present time, and the power can be accumulated to show the total power used during a period of time and its cost. U.S. Pat. No. 7,174,260 issued Feb. 6, 2007 to Tuff, et al. describes such power monitor. It uses an optical sensor to monitor the power meter wheel as it turns and processes this information into rate of power use and cost. This information is wirelessly sent to a display device located in the residence. The device also accumulates the total power used during a period of time and its cost.

Other monitors extract information about the status of an electrical device by analyzing the amount of power used as a function of time. A power measuring device is used for each monitored electrical device and the power measurements are communicated to a central processor. Analysis of the changes in power use can determine the status of the device which is then displayed. U.S. Pat. No. 6,906,617 issued Jun. 14, 2005 to Van der Meulen describes such a system. The disadvantage of this approach is that a separate complex power monitor is used for each electrical device.

More sophisticate monitoring systems record the energy used over a period of time and processes and/or displays the information to make it more useful to the consumer. For example a graph of power use versus time can show the consumer how power use varies with household activity. As another example, the consumer might specify a start time and an end time, and the monitor might respond with the cost of power used during this period. U.S. Pat. No. 7,246,014 issued Jul. 17, 2007 to Forth, et al. describes such a system and describes several ways to display the information.

An increasing number of utilities are charging different rates for power depending on the time of day, day of week, or based on the total electricity used during the billing period. Some monitoring systems integrate this information with the measured power to provide the consumer more accurate and useful information that might encourage them to reduce energy consumption and/or change when they use power. For example, they might chose to reduce the amount of air conditioning used when electricity is expensive and to run their pool pump or do laundry at times when electricity is less expensive. U.S. Pat. No. 5,289,362 issued Feb. 22, 1994 to Liebl, et al. describes a system where a variation in the cost of electricity alters the settings for HVAC equipment.

While knowing the power and total power used by a household has value, there is more value in knowing the power and total power used by individual electrical devices. This information enables the consumer to make informed decisions about altering usage patterns and/or upgrading to new and/or higher efficiency devices. There exist power monitors that can be connected to an individual power circuits, individual outlets, and to individual devices. The disadvantage of this approach is an additional power sensor and a method of reporting its measurements are needed for each device monitored.

U.S. Pat. No. 4,858,141 issued Aug. 15, 1989 to Hart, et al. discloses a non-intrusive appliance monitor apparatus. It discloses a technique to track the power used by individual electrical devices based on analysis of the variations in total power used by a collection of devices. It is based on the observation that different appliances use different amounts of power, so a step change in total power can be attributed to a device in the group that uses power at the rate corresponding to the measured step change. The times when the step increases and decreases in power occur are recorded and associated with a specific device to calculate the total power used by that device during a predetermined period of time. The disclosure also uses step changes in the measured reactive power as further discriminator between appliances that use nearly the same real power. The technique disclosed can reliably track a small number of appliances with specific electrical properties and that use different amounts of power.

However, Hart et al. has many limitations that make it impractical for use in most modern residential homes. Modern homes have dozens of different devices. Many of the devices of interest use hundreds of watts, so these devices generate similar turn on and turn off steps that can not be separately tracked. Many devices use variable power while they are on, so the turn on and turn off steps do not match; therefore they can not be accurately tracked. Many electronic devices use power in short frequent pulses. These frequent pulses will often occur at nearly the same time as the turn on steps and turn off steps of other appliances. This introduces large uncertainty in step measurements, especially at the measurement rate of one sample per second preferred by Hart et al. The disclosure states:

"The power consumed by the residence is preferably measured approximately every second. The exact rate is not critical to the method. A slower rate can be used, but this leads to more frequent errors by the device. A slightly higher rate may be preferable, but there is no apparent advantage in exceeding approximately ten measurements per second. The measurements need not be at regular intervals."

Hart et al. teaches the method of using admittance scaling to eliminate the effects of voltage variation on the measured power. Modern devices with electronic control often behave differently. For example, some devices use a constant amount of power independent of the supply voltage.

Some electrical devices turn on and off very slowly. For example HVAC fans may take a minute or more to reach full speed, so the rate of change is very small. Such a step is difficult to detect given the disclosed behavior of the "steady state detector 22".

Hart et al. discloses a technique that works only for very limited circumstances, and does not provide a practical method of tracking multiple electrical devices in a typical residential home.

U.S. Pat. No. 5,483,153 issued Jan. 9, 1996 to Leeb, et al. discloses a transient event detector for use in non-intrusive load monitoring systems. It discloses a technique to identify different devices by analyzing variations of electrical parameters during turn on transitions. These turn-on transient variations are captured as envelops of harmonic content of parameters such as real power, reactive power, and current. These envelops are different for different classes of electrical devices. Sections of the envelop that vary rapidly are called "v-sections", and only these portions of envelops are used in the identification of devices. It specifically states:

"Searching for complete transients is an undesirable approach because it limits the tolerable rate of event generation. No two transient events could overlap significantly if each transient were to be identified correctly. Instead, the transient event detector in accordance with the present invention searches for a time pattern of segments with significant variation, or "v-sections", rather than searching for a transient shape in its entirety."

A further limitation is illustrated in FIG. 7 with the description: "The overlap condition in FIG. 7 would not generally be tractable, since the instant start v-section and the first induction motor v-section overlap severely." A v-section "locked out" behavior is disclosed based on the "assumption that v-sections should not overlap".

Leeb et al. discloses an improved technique of transition analysis compared to Hart et al. It is able to associate turn-on transients more accurately and to a broader range of different electrical devices. However, Leeb et al. does not disclose how to make a practical power monitor for residential home because it provides only modest improvement in the ability to deal with overlapping turn on transients and provides no improvement in associating turn off transients with devices that are on. Therefore it does not enable tracking individual electrical devices in a typical residential home.

What is missing in the prior art for power monitors is a practical and economical method of using a single central power monitor to provide detailed information about the power and total power used by multiple individual electrical devices.

OBJECTIVES OF THIS INVENTION

It is an objective of this invention to provide a method for using a single set of power sensors and data analysis to provide the power and total power used by each of multiple individual electrical devices supplied by a common alternating current service.

It is a further objective of this invention to provide a power monitoring system that is practical for residential retrofit and that is able to provide useful information to consumers about the power and total power used by each of multiple electrical devices.

SUMMARY

The invention is a method for measuring and processing a plurality of electrical parameters of a common alternating current (AC) service that supplies multiple different electrical devices such that the power use rate and total power used by each of multiple devices is determined. Sensors provide high resolution signals corresponding to the current and voltage of the AC power supplied to the service panel typical of those used in residential construction. Analog-to-digital conversion and processing circuits determine multiple electrical parameters with high resolution at a sampling rate sufficient to determine the electrical parameters for approximately each AC cycle. The electrical parameters are stored as a large data set in a memory with sufficient capacity to store several months of electrical parameters representing each AC cycle. The data set is processed to extract complete on-off cycles of the devices. The on-off cycles are represented by instance structures. The characteristics of the instance structures are used to determine device structures. Each device structure characterizes one of the multiple devices. The contributions associated with the extracted instance structures are subtracted from the data set, making is possible to extract additional instance structures from the residual information in the data set. Information from the device structures are used to help extract instances structures that are partially obscured by overlapping instance structures. The newly extracted instances structures are subtracted from the data set and processing continues until no more instance structures can be extracted. Information from the extracted instance structures and device structures are further grouped and processed to provide useful information reports to a consumer. As the electrical parameters are determined and added to the data set, they can be incrementally processed so that near real time information can be provided to the consumer. The cost of operating each device and other information enables the consumer to make informed decision regarding energy use and conservation.

BRIEF DESCRIPTION OF THE DRAWINGS

The invention will be understood more fully from the detailed description given below and from the accompanying drawings of the preferred embodiments of the invention which, however, should not be taken to limit the invention to the specific embodiments described, but are for explanation and understanding only.

FIG. 7 illustrates a portion of a device structure that characterizes the complete on-off cycles of a refrigerator.

FIG. 14A illustrates the report structure used to produce useful information and displays for the consumer.

FIG. 14B illustrates the cost structure used to represent various methods of pricing the electrical power supplied by a utility.

FIG. 15 is an example of a consumer display showing various information regarding power, cost, and status for several electrical devices.

DETAILED DESCRIPTION

Figure 1:
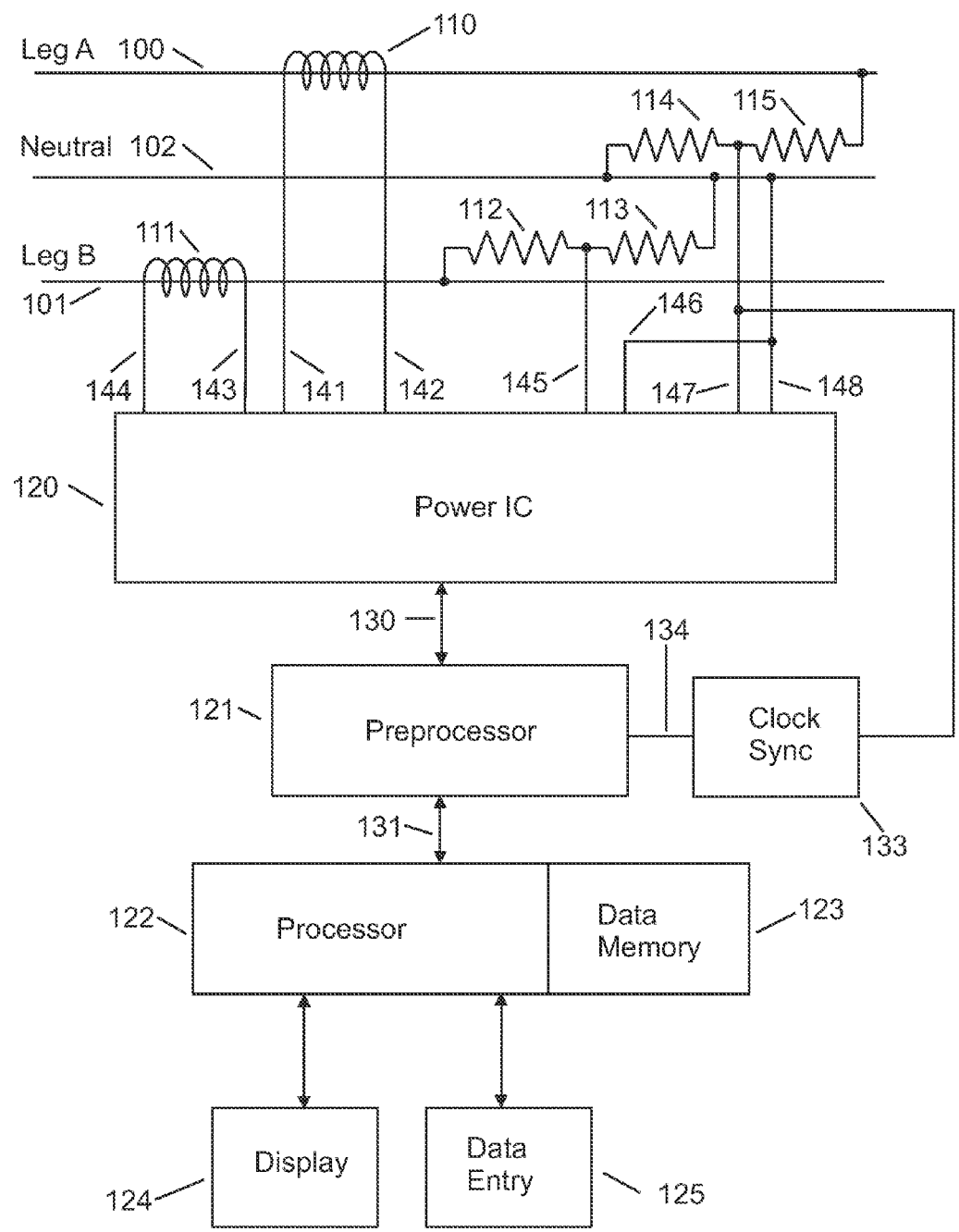
FIG. 1 is a diagram of a circuit for sensing voltage and current signals of a typical residential AC power service and for measuring and processing these signals.

A typical household has dozens of different electrical devices that consume electrical power. Households typically have single examples of appliances such as HVAC equipment, washer, dryer, refrigerator, stove, microwave, toaster, coffeemaker, etc. Each of these devices has specific electrical behaviors during a complete on-off cycle. It is very unlikely that the combination of these behaviors is identical for different devices. Even though the average continuous real power may be the nearly identical for some devices, differences in the electrical parameters during a complete on-off cycle will generally be sufficiently different to enable unique identification.

Multiple instances of the same device served by the same supply generally can not be uniquely identified. For example, all 60-watt incandescent light bulbs will be recognized as the same device. However, multiple instances of 60-watt lights can be tracked by keeping count as they are turned on and off. If two 60-watt light bulbs are controlled by a single switch, then they are identified as a single 120-watt light.

There is great variation in the characteristic of complete on-off cycles of a specific household device, and even greater variation between different household devices. The duration of a complete on-off cycle may vary from a less than a second to more than a day. While a device is on, the power may be essential static, or may vary in endlessly different ways. The on-off cycle of most devices begins with a step change event in electrical parameters and ends with a step change event. A step change event occurs when the change in the rate of change (the digital equivalent of the second derivative) of an electrical parameter exceeds a predetermined threshold.

Step change events in the current, real power, and reactive power generally occur at the same time since these parameters are related by the characteristics of the device. However, it is only necessary to consider the step change event in the current when determining the start and end of on-off cycles. While it is possible for step change events to occur at the same time in the real power and reactive power without a corresponding step change event in the current, these cannot occur at the start or end of an on-off cycle.

A typical resistive heating element uses full power within a few cycles after it is turned on (producing a positive step change event), and uses essentially constant power until it is turned off (producing a negative step change event). However, heating elements are typically components in thermostatically controlled devices such as coffeemakers, ovens, and clothes dryers. For a coffeemaker, the heating element is on for several minutes when the coffeemaker is first turned on. After the coffee is brewed, the heater is turned on and off regularly to keep the coffee at a stable hot temperature. The duty cycle gets progressively smaller as coffee is consumed. The cycling continues until the coffeemaker is turned off. During the complete on-off cycle of the coffee maker (which may last several hours), its heating element may go through more than 100 on-off cycles.

As another example, an induction motor driving a fan typically has a small but significant sinusoidal power variation with a period of several seconds. This is caused by long period oscillations in the air flow which affect the power used by the motor.

As another example, a universal motor takes several seconds to reach stable power, but the stable power depends on the load on the motor. A universal motor is typically used in a vacuum cleaner, so its power depends on the volume of air passed through the cleaner. Load dependent variations can exceed several hundred watts.

As another example, many electronic devices use power in short, repetitive pulses. The pulse rate can vary from less than one per second to longer than one per minute. While these devices may not use significant total power, they generate many step change events. Some will occur during the dynamic parts of the on-off cycles of other devices, making accurate identification more difficult.

As another example, many devices contain and control other devices that have separate on-off cycles. A washing machine typically has one or more motors and several solenoids to control motor functions (such as agitating, spinning, and pumping) and for controlling hot and cold water and dispensing detergent. A complete washing machine on-off cycle is composed of several on-off cycles of its component devices.

Some on-off cycles are produced automatically and continuously, depending only indirectly on household activity. Refrigerators cycle regularly and consistently, with small variations caused by defrost cycles, ice making, and door opening. Direct consumer activity cause some on-off cycles. Some examples are lights, appliances, and electronic devices. Some on-off cycles are started by consumer activity and then automatically produce multiple on-off cycles until turned off.

The identification of every electrical device in a household does not need to be complete nor perfectly accurate. It is most important that the devices using the largest amount of total power are identified and accurately tracked. Devices such as air conditioners, electric stoves, and water heaters that use the most power are the easiest to identify and accurately track. However, devices that use less power but operate for longer periods of time may consume more total power. For example refrigerators are usually among the top five power users although they typically use 100 to 150 watts when operating.

The most serious reporting error is caused by failing to recognize a device turning off. This can cause a relatively low power device used infrequently and for short periods of time to be reported as a top total power user. One part of a report that is obviously wrong will cause the consumer to devalue all other parts of the report. Therefore the identification and tracking process needs to have robust protections against such errors.

The present application discloses a device and method for automatically identifying and tracking multiple electrical devices of the types described in the forgoing in the environment of a residential home. The electrical parameters measured at the electrical supply are the result of a linear sum of all on-off cycles of all electrical devices in the home.

A portion of the on-off cycles are accurately determined by processing a large data set of high resolution measurements of electrical parameters for a period of time that includes multiple on-off cycles of many devices.

Complete on-off cycles that are sufficiently similar and are accurately determined are used to characterize the behavior of specific devices. Less accurately determined on-off cycles are then associated with these devices, but they do not affect the characterization of the devices. The contributions of all associated on-off cycles are subtracted from the data set. The measured contributions of the less accurately determined on-off cycles may be modified using information from the characterization of the associated device.

Then the residual data set is processed again to extract additional on-off cycles. The residual data set is less complex, making it possible to determine additional on-off cycles that can be associated with devices. After potential modifications based on the characterization of the associated device, the contributions of these on-off cycles are then subtracted from the residual data. The residual data is then reprocessed again. This processing cycle is repeated until all remaining on-off cycles cannot be associated with one of the characterized devices. The remaining on-off cycles are then further processed to determine if they can be decomposed into overlapping on-off cycles of characterized devices.

Finally, the power consumed and the total operating time of each device is determined by accumulating the power and duration of all on-off cycles associated with each device.

One aspect of present application is to provide near real time information regarding the on-off state of multiple devices and to separate consumer controlled devices from automatic devices. For example, when the consumer is leaving the home unoccupied, it is useful to provide a display of the electrical devices that are on. Most important are the devices that are only useful when the home is occupied, especially high power devices such as the oven and incandescent lights. The consumer can then choose to turn these devices off before leaving. For this example, there is little use in displaying the state of the water heater or refrigerator since the consumer will not choose to turn these off.

FIG. 1 is a diagram showing the major components of the preferred embodiment for measuring and processing. It is designed for a typical residential 3-wire, 240 volt single phase electrical service. Those ordinarily skilled in the art can easily adapt the preferred embodiment for other electrical services. Leg A 100 supplies 120 VAC (volts of alternating current) relative to the neutral supply 102. Leg B 101 also supplies 120 VAC relative the neutral supply 102, but the AC voltage is 180 degrees out of phase with Leg A, so there is 240 VAC between Leg A and Leg B.

The current sensor coils 110 and 111 and voltage sensor networks 112, 113, 114, and 115 are typically located in the service panel between the power meter and the circuit breakers connected to the wires that distribute the power throughout the house. The differential signals 141 and 142 produced by coil 110 are proportional to the AC current in Leg A and are suitable for input to Power IC 120. The differential signal 143 and 144 produced by coil 111 are proportional to the AC current in Leg B and are suitable for input to Power IC 120. Resistors 112 and 113 divide the voltage between Leg B and neutral 102 to produce the differential signal 145 and 146 suitable for input to the Power IC 120. Resistors 114 and 115 divide the voltage between Leg A and neutral 102 to produce the differential signal 147 and 148 suitable for input to the Power IC 120.

Power IC 120 is designed specifically for use in utility power meters. Several suitable commercial products are readily available. The preferred embodiment uses part number CS5467 provided by Cirrus Logic, Inc. (www.cirrus.com), 2901 Via Fortuna, Austin, Tex. 78746. Power IC 120 contains analog conditioning circuits and a 16-bit, 4-channel analog-to-digital converter for converting the sensed current and voltage signals into numerical values. It also contains digital processing circuits for providing various measures of power and characteristics of the voltage and current sensed in Leg A and Leg B.

The on-off cycles of electrical devices have differentiated behavior that can be seen at various resolutions of time and value. The preferred embodiment uses measurements for each compete AC cycle. The sampling rate is about 4000 per second, depending on the frequency of the clock signal 134 applied to Power IC 120. Clock Sync circuit 133 synchronizes the clock signal to the power supply frequency. Circuit 133 is connected to the Leg A divided voltage 147 and generates clock signal 134 such that exactly 67 samples are measured and processed per cycle of 60 Hertz power, equivalent to a sampling rate of 4020 samples per second. Clock synchronization reduces measurement errors caused by aliases of the power frequency and the sampling frequency.

Power IC 120 also has interface circuits that enable Preprocessor 121 to set configuration parameters in 120 and to read the values measured and computed by 120. Power IC 120 is configured to process the samples representing one complete AC cycle (67 samples) to produce the following electrical parameters for Leg A and for Leg B:

1) RMS Current
2) RMS Voltage
3) Real power
4) Reactive power

Power IC 120 provides these electrical parameters as 24-bit quantities (3 bytes), ensuring that the 16-bit accuracy of the analog-to-digital conversion is carried throughout the calculations. Preprocessor 121 reads these 8 electrical parameters each AC cycle and prepares a report that includes a time stamp and the 8 electrical parameters to 16-bit accuracy. Each report contains 20 bytes, so the total raw data per day is approximately 100 Mb.

The measured electrical parameters are essentially stable most of the time. Therefore the raw data is very redundant and can be compressed by a variety of techniques well known by those ordinarily skilled in the art of computer programming. For example, adaptive differential coding can compresses the data by a factor of over 100 without significant loss, so that the compressed data per day is about 1 Mb. This type of compression is used in the instance structures of FIG. 3 and device structures of FIG. 4 described in the following.

Preprocessor 121 is single chip programmable processor with sufficient processing capacity to read the electrical parameters from Power IC 120 and prepare reports that transfer information to Processor 122. Several manufactures each provide several products that are suitable for this purpose. One example is model PIC24HJ128GP202 provided by Microchip Technology Inc. (www.microchip.com), 2355 West Chandler Blvd., Chandler, Ariz.

The data connection 130 between Power IC 120 and Preprocessor 121 is a high speed serial interface. Both circuits support a compatible protocol that operates at up to 1 Mb/s (million bits per second). Including overhead, it takes less than 1 millisecond to transfer the 24 bytes of data from Power IC 120 to Preprocessor 121.

Preprocessor 121 communicates via data link 131 with Processor 122. This data link may be a wired connection using an industry standard such as USB or RS-232, or it may be wireless using a standard protocol such as 802.11. The preferred embodiment uses a wireless 802.11 data link.

Processor 122 may be a general purpose personal computer such as a laptop or a specialized processor such as used in a residential energy management system. Processor 122 includes a large data memory 123 used to store reports from Preprocessor 121. This nonvolatile memory may be solid-state flash memory such as used in digital cameras or disk memory.

Data compression can be done by either Preprocessor 121 or Processor 122 so that about 1 Mb of compressed data per day is stored. Therefore, a 1G (Gigabyte) memory has the capacity to store all the information sent by Preprocessor 121 for a time period spanning over 2 years. In the following disclosure, the whole of this information is called the data set. The data set is expanded by Processor 121 before processing to extract instance structures and subtract their contributions from the data set. Processor 121 then recompressed the remaining data set for storage in Data Memory 123.

Some embodiments may combine the functions of Preprocessor 121, data link 131, and Processor 122 into a single processor or single circuit. This can be easily accomplished by those ordinarily skilled in the art of circuit design and programming. This invention anticipates this combination of function. In addition, advances in technology or application requirements may enable and/or require additional and/or other combinations of functions. This invention also anticipates these other combination.

Some other embodiments may combine the functions of Preprocessor 121, clock sync 133, and data link 131 into the electrical power meter provided by the utility company. Power meters that transmit power measurements in real time are currently entering service. However, the sampling rate is slower than required by this invention. Those ordinarily skilled in the art can easily adapt such power meters to provide the electrical parameters at the sampling rate and accuracy used by this invention.

Processor 122 sequentially receives reports from Preprocessor 121 and stores them sequentially in the data memory 123. This information is highly redundant, so Processor 122 may compress the data before storage into data memory 123. Processor 122 periodically processes the data stored in data memory 123 to produce information about power use that is useful to the consumer.

Processor 122 has a display 124 and a consumer data entry device 125. The consumer data entry device may be a standard keyboard, mouse, touch pad, or joy stick with buttons, or a touch screen associated with display 124. A consumer uses the data entry device to make requests for information. Processor 122 responds by processing the reports contained in data memory 123 and generating a display of the requested information on display 124.

Some other embodiments may provide the function of Processor 122 using the internet and a centralized computer facility. In this case, the data link 131 would connect to the internet and the centralized computer would store and process the data. The consumer could then access the information using a standard internet browser connected to the centralized computer facility.

Figure 2:
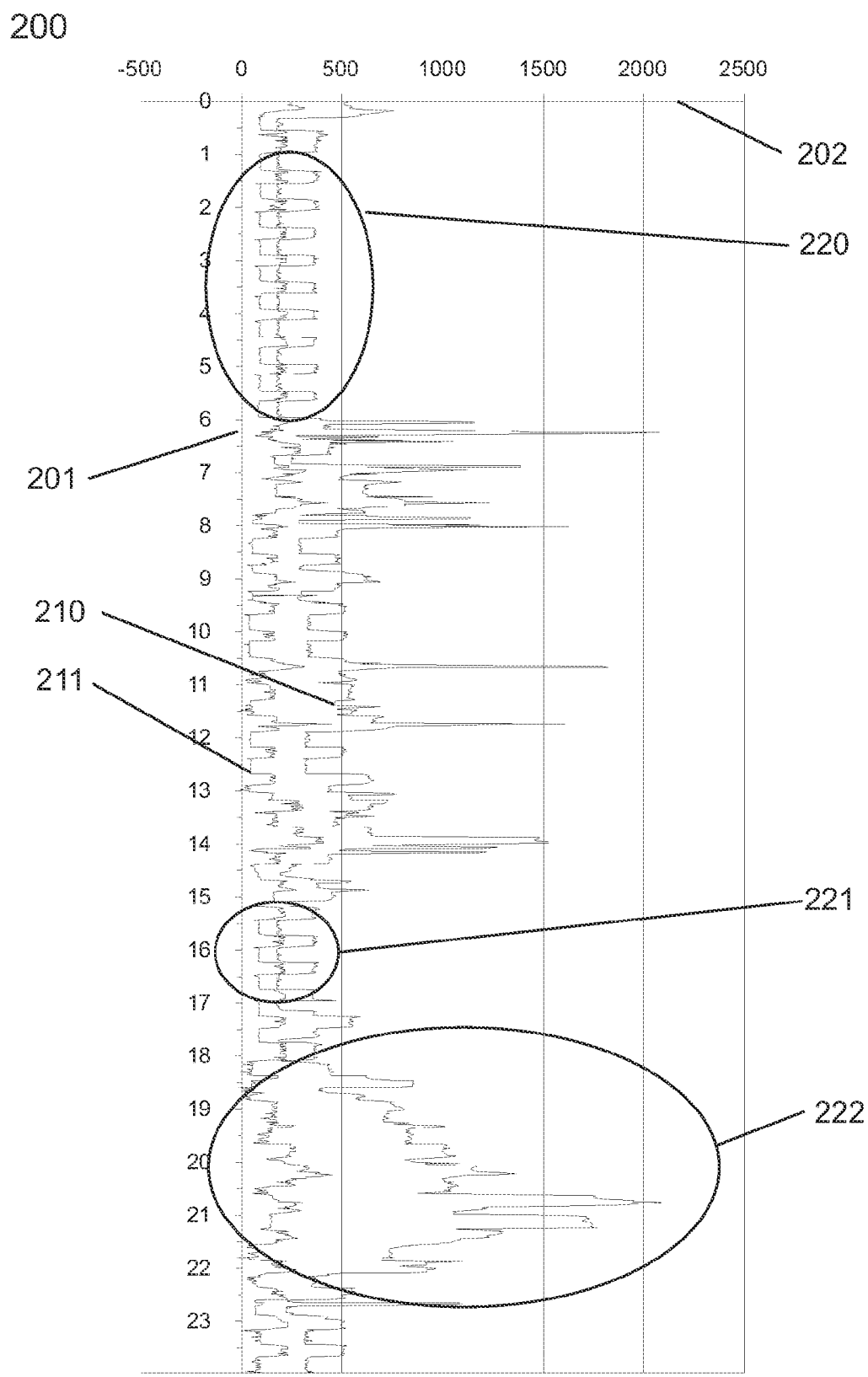
FIG. 2 is a graph of the total real power and reactive power used in a typical residential home during a 24 hour period.

FIG. 2 is a graph 200 representing typical residential household data received from Preprocessor 121 via data link 131 during a 24 hour period. The vertical axis 201 is the time of day; midnight corresponding to 0 on the axis and 11 pm corresponding to 23 on the axis. The time resolution is one minute. Each data point in the graph represents the average value of 3600 samples. The horizontal axis 202 is the power in watts, ranging from −500 to 2500. The real power 210 is the sum of the Leg A and Leg B real power and the reactive power 211 is the sum of Leg A and Leg B real power. The ellipses 220 and 221 enclose portions of the graph that show a relatively low level of activity during the period from 1:00 am until about 6:00 am and from 3:30 pm to 5:00 pm in the afternoon. Ellipse 222 encloses the period of highest activity and power which peaks about 9:00 pm (21 on axis 201). More than a thousand complete on-off cycles occurred during this 24 hour period. More than half of the on-off cycles are not apparent in this graph because their durations are less than 1 minute.

An obvious feature of FIG. 2 is the regular on-off cycles of the refrigerator. Ellipse 220 encloses nine refrigerator on-off cycles. There were 45 refrigerator on-off cycles during the 24-hour period. The on-off cycles are visually apparent during the low activity times 220 and 221, but are obscured during the high activity time 222. Using the process described in the following, the refrigerator on-off cycles are accurately determined during the low activity time. These on-off cycles are used to fully characterize the refrigerator as a device. Once fully characterized, it is possible to recognize at least a portion of a refrigerator on-off cycle during high activity times. The refrigerator characterization is used to determine the portions of the on-off cycle obscured by other activity. The contribution of the refrigerator on-off cycle is then subtracted from the total, thereby making the residual data set less complex.

Figure 3:
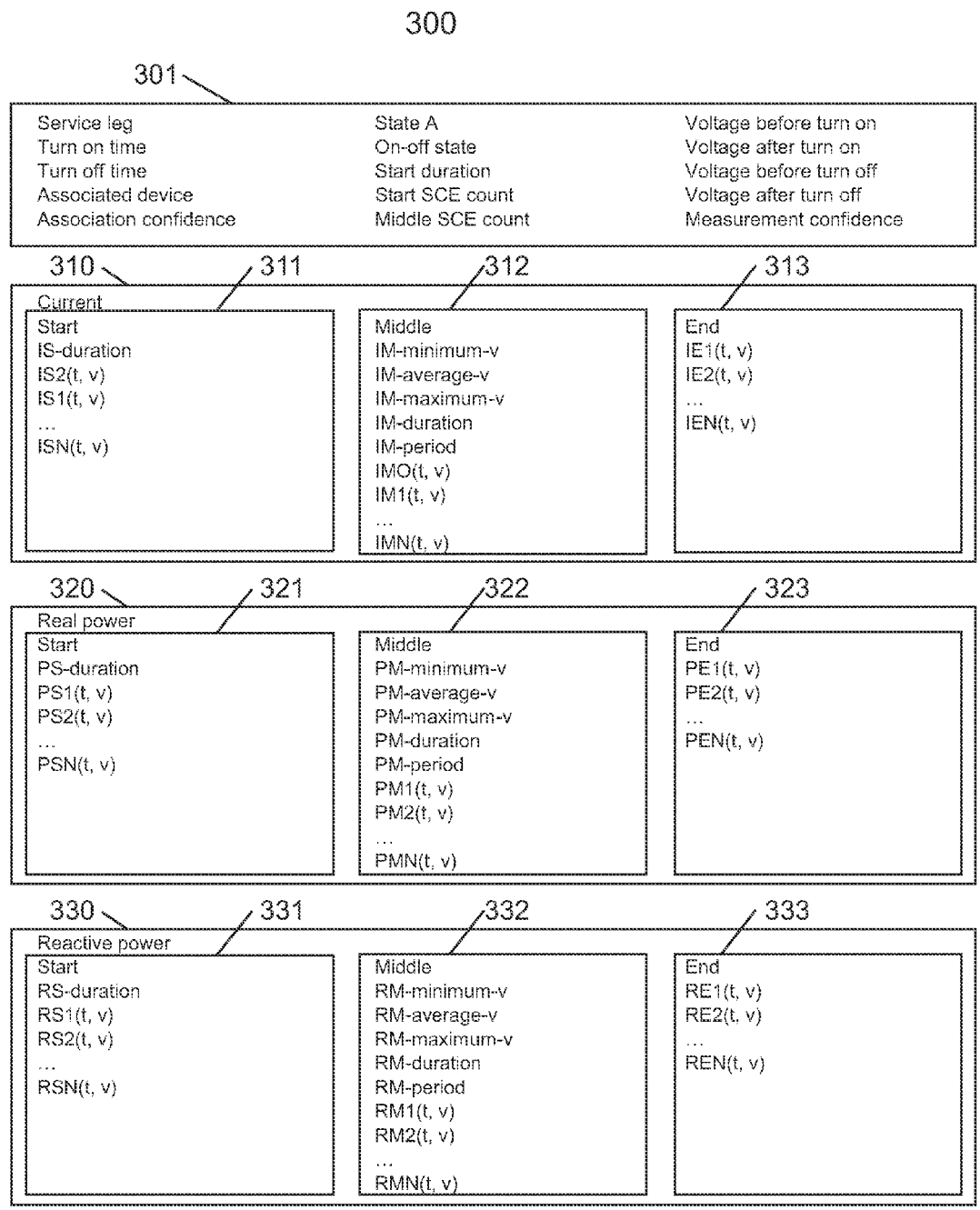
FIG. 3 illustrates the data structure used to store the representation of a single instance of an on-off cycle of an electrical device.

FIG. 3 illustrates the on-off cycle instance data structure 300 used to store the representation a single instance of an on-off cycle. The structure has sufficient flexibility to accurately represent all on-off cycle examples described in the foregoing. The substructure 301 contains general parameters that describe the specific on-off cycle. These parameters are:

1. Service leg—either A or B
2. Turn on time—the time (including date information) when the on-off cycle started
3. Turn off time—the time (including date information) when the on-off cycle ended
4. Associated device—the electrical device associated with this on-off cycle
5. Association confidence—a representation of confidence in the match of this instance structure and its associated device structure
6. State A—a state variable used during processing the electrical parameters
7. On-off state—represents the state of the on-off cycle; either on of off
8. Start duration—the duration (in samples) of the start section of the on-off cycle (the longest of current, real power, or reactive power)
9. Start SCE count—the number of step change events detected during the current start section (excluding the beginning of this on-off cycle)
10. Middle SCE count—the number of step change events detected during the current middle section 11. Voltage before turn on—the measured voltage before the on-off cycle started
12. Voltage after turn on—the measured voltage after the on-off cycle started
13. Voltage before turn off—the measured voltage before the on-off cycle ended
14. Voltage after turn off—the measured voltage after the on-off cycle ended
15. Measurement confidence—a representation of the confidence of the measurement of the on-off cycle. The value is highest when there are no other on-off cycles that that may affect the value of the parameters. The value becomes smaller as more on-off cycles have potential affect the values.

Instance structure 300 also contains current substructure 310, real power substructure 320, and reactive power substructure 330. Each of these has the same data storage capabilities. Each substructure has a start section for storing information representing the start of the on-off cycle (311, 321, and 331), a middle section for storing information representing the continuous and sustained section of the on-off cycle (312, 322, and 332), and an end section for storing information representing the end of the on-off cycle (313, 323, and 333).

The start section 311 contains the parameter IS-duration and a variable length list of N data pairs $IS1(v, t)$, $IS2(v, t)$ ..., $ISN(v, t)$. IS-duration is the duration (number of samples) of the start section. Section 321 contains the parameter PS-duration and a variable length list of N data pairs $PS1(v, t)$, $PS2(v, t)$ ..., $PSN(v, t)$. PS-duration is the duration (number of samples) of the start section. Section 331 contains the parameter RS-duration and a variable length list of N data pairs $RS1(v, t)$, $RS2(v, t)$ ..., $RSN(v, t)$. RS-duration is the duration (number of samples) of the start section.

Throughout this disclosure N is used to represent any arbitrary number, and may represent a different number each time it is used. Therefore N may have a different value for each substructure.

The v parameter is the value of a sample of the electrical parameter that is attributed to this on-off cycle. (The preferred embodiment uses one sample per AC cycle.) The v parameter is the difference between the measured value and the stable base value established prior to start of the on-off cycle. The method used to establish the stable base value is described below in the disclosure associated with FIG. 9.

The t parameter is the number of samples between the previous data pair and the current data pair. For the first data pair, $t=0$. After the first data pair is stored, the v parameter of successive samples is compared to the last v parameter stored. When the difference is greater than a predetermine threshold, then another data pair is added to the list. For all data pairs after the first, t is the number of samples since the last data pair. The predetermined threshold is typically 1%-5% of average value of the v parameter for the past few samples. When the v parameter is rapidly changing, the data pairs represent successive samples and $t=1$. When the v parameter is slowly changing, the values of t increase as the rate of change becomes smaller. The start section of the on-off cycle ends when:
1. the v parameter becomes substantially stable, or
2. the v parameter becomes cyclic in variation, or
3. the v parameter becomes chaotic in variation, or
4. the v parameter value begins a rapid decrease to a value approximately equal to zero The value of the start duration parameter (IS-duration, PS-duration, and RS-duration) is the sum of the t values in the list of data pairs.

The middle section substructures 312, 322, and 332 contain at least five parameters. The minimum v parameter (IM-minimum-v, PM-minimum-v, and RM-minimum-v) is the minimum value of the v parameter during the middle section of the on-off cycle. The average v parameter (IM-average-v, PM-average-v, and RM-average-v) is the average value of the v parameter during the middle section of the on-off cycle. The maximum v parameter (IM-maximum-v, PM-maximum-v, and RM-maximum-v) is the minimum value of the v parameter during the middle section of the on-off cycle.

The duration parameter (IM-duration, PM-duration, and RM-duration) is the duration of the middle section of the on-off cycle. The duration parameter is less than the difference between the turn-off time and turn-on time stored in substructure 301 because it excludes the durations of the start section and the end section. The duration parameter value is zero for short on-off cycles that essentially have only a start section and an end section.

The period parameters (IM-period, PM-period, and RM-period) are set to zero if there is no periodic variation in the parameters during the middle section of the on-off cycle. If there is periodic variation, then the period parameter is the number of samples between the beginnings of each periodic variation. For chaotic variation, the period parameter is about equal to the duration parameter.

If there is periodic or other variation including chaotic, then the middle section also contains a variable length list of N data pairs ($IM1(v, t)$, $IM2(v, t)$ ..., $IMN(v, t)$; $PM1(v, t)$, $PM2(v, t)$ ..., $PMN(v, t)$; and $RM1(v, t)$, $RM2(v, t)$ ..., $RMN(v, t)$) that represent the variation. The v parameter represents the variation of the electrical parameter relative to average-v parameter (IM-average-v, PM-average-v, and RM-average-v). The t parameter has the same meaning and behavior as described in the foregoing start section. The sum of all the t parameters in the list of data pairs is less than or equal to the period parameter.

The end sections of the substructures 313, 323, and 333 contain a variable length list of N data pairs $IE1(v, t)$, $IE2(v, t)$ ..., $IEN(v, t)$; $AE1(v, t)$, $AE2(v, t)$ ..., $AEN(v, t)$; and $RE1(v, t)$, $RE2(v, t)$ ..., $REN(v, t)$. These data pairs have the same properties as those in the start sections described in the forgoing. The v-parameter of the last data pair has a value of approximately zero. Typically there are only two or three data pairs in the end sections.

The method used to determine the values of the parameters of the instance structure 300 is described below in the disclosure associated with FIG. 6 and FIG. 11.

Figure 4:
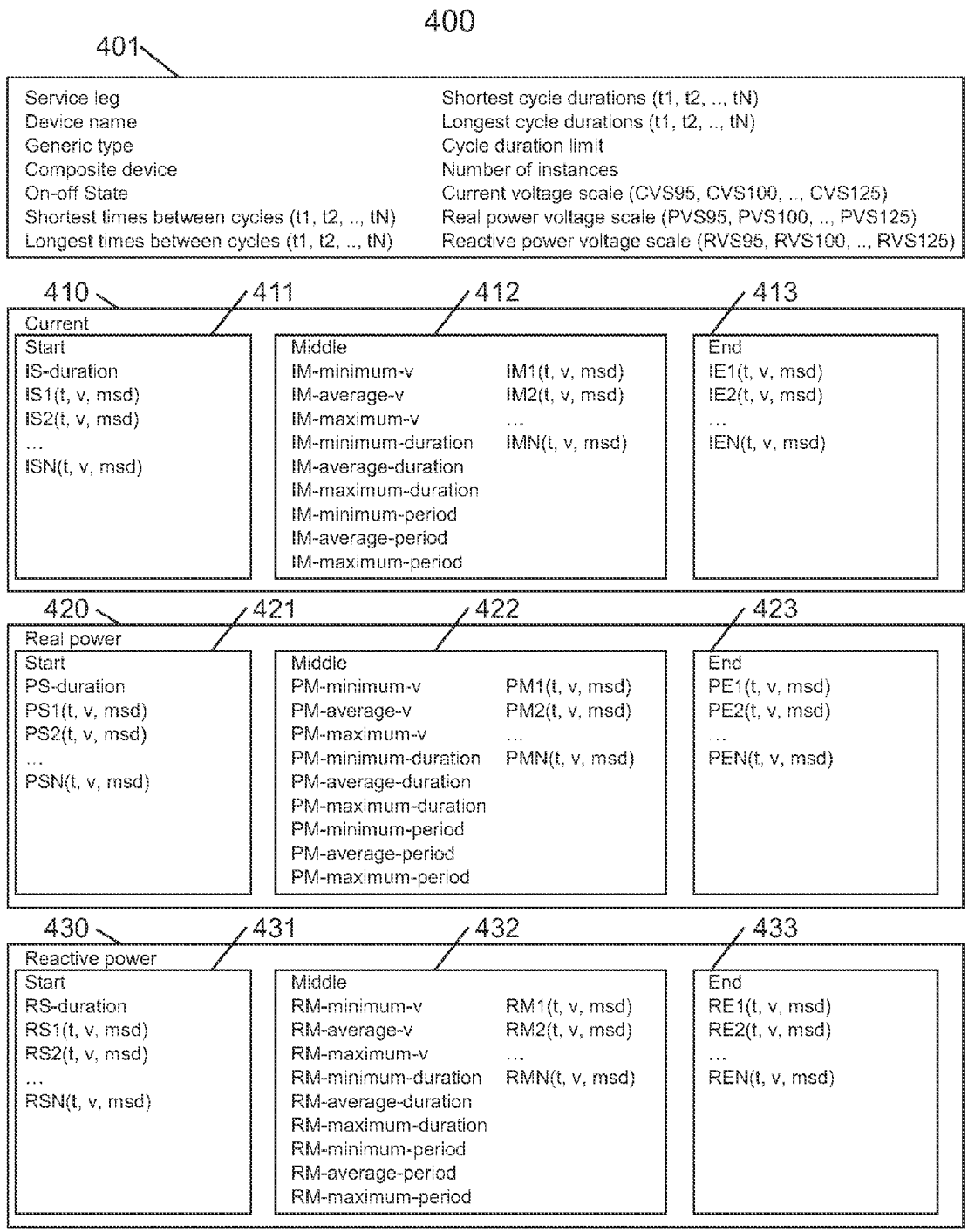
FIG. 4 illustrates the data structure used to store the characterization of an electrical device.

FIG. 4 illustrates the device structure 400 used to store the characterization of on-off cycles of an electrical device. The values of its parameters are determined by consolidating data from instance structures 300 that can be associated with the electrical device. A single instance structure 300 with high Measurement confidence is used to initialize a device structure 400. Other complete instances structures 300 are compared to the existing device structures 400, and are associated with the device structure it most closely matches, provided the match is sufficiently close. If the Measurement confidence is sufficiently high, the parameter values in the newly associated instance structure are consolidated with the parameter values in the associated device structure. If there is no sufficiently close match of an instance structure with high Measurement confidence to an existing device structure, a new device structure 400 is created. Instance structures with low Measurement confidence are not used to create new device structures or consolidated with associated device structures. In the following disclosure regarding FIG. 4 and the consolidation of instance structures, the phrase "associated instance structures" means "associated instance structures with a sufficiently high value of Measurement confidence".

The substructure 401 contains parameters that generally characterize the on-off cycles. These parameters are:
1. Service Leg—either Leg A or Leg B
2. Device name—the name used when producing reports for the consumer. The name is generated automatically based on generic behavior and can be changed by the consumer.
3. Generic type—the closest match to the behavior of electrical devices provided in a predetermined library of determined device structures.
4. Composite device—link to the composite device that is associated with this device. Independent devices have a null link.
5. On-off State—the operating status of the device, set to on if the On-off state of any associated instance is set to on, otherwise set to off.
6. Shortest times between cycles—a list of N values (t1, t2, . . . , tN) representing the shortest times between on-off cycles associated with this device.
7. Longest times between cycles—a list of N values (t1, t2, . . . , tN) representing the longest times between on-off cycles associated with this device.
8. Shortest cycle durations—a list of N values (t1, t2, . . . , tN) representing the shortest durations on-off cycles associated with this device.
9. Longest cycle durations—a list of N values (t1, t2, . . . , tN) representing the longest durations of on-off cycles associated with this device.
10. Cycle duration limit—the maximum duration of any on-off cycle for this device. The value is determined from the history of activity and is used to reject the association of low confidence instance structures 300 with excessive durations.
11. Number of instances—the number of instance structures 300 consolidated into this device.
12. Current voltage scale (CVS95, CVS100, CVS105, CVS110, CVS115, CS120, CSV125)
13. Real power voltage scale (PVS95, PVS100, PVS105, PVS110, PVS115, PVS120, PVS125)
14. Reactive power voltage scale (RVS95, RVS100, RVS105, RVS110, RVS115, RVS120, RVS125)

The scale parameters 12, 13, and 14 are voltage dependent scale factors applied to all the values of current, real power, and reactive power contained in the instance structures 300. The number component of each parameter name corresponds to a supply voltage. For example CVS100 is the Current voltage scale when the supply voltage is 100 volts. Linear interpolation is used to determine intermediate scale values for voltages between the 5 volts spacing of scale factors. The scale factors are applied to the instance values before making comparisons and consolidation.

These scale factors are all initialized to 1. If the electrical service provides stable voltage, these parameters can not be determined and have no affect. If the supply voltage is variable, then the each instance structure with a different supply voltage contributes to determining the scale factors. The scale factors are determined using least squares linear regression of the values of IM-average-v, PM-average-v, and RM-average-v from each associated instance structure versus the average values of the Voltage after turn on and Voltage before turn off. The calculation is done separately for each adjacent pair of scale factors that have at least two instances structures representing voltages between the pair of scale factors.

Device structure 400 also contains current substructure 410, real power substructure 420, and reactive power substructure 430. Each of these has the same data storage capabilities. These substructures are similar to corresponding substructures in the instance structure 300 and the parameter values are determined by consolidating values from the associated instance structures. Each substructure has a start section for characterizing the start of the on-off cycle (411, 421, and 331), a middle section for characterizing the continuous and sustained section of the on-off cycle (412, 422, and 432), and an end section for characterizing the end of the on-off cycle (413, 423, and 433).

The start section 411 contains the parameter IS-duration and a variable length list of N data triplets IS1(v, t, msd), IS2(v, t, msd) . . . , ISN(v, t, msd); start section 421 contains the parameter PS-duration and a variable length list of N data triplets PS1(v, t, msd), PS2(v, t, msd) . . . , PSN(v, t, msd); and start section 431 contains the parameter RS-duration and a variable length list of N data triplets RS1(v, t, msd), RS2(v, t, msd) . . . , RSN(v, t, msd). The first instance structure 300 used to initialize this device structure establishes the durations and lengths N of the lists and the value of each t parameter.

The v parameters are the average of the corresponding v parameters of associated instance structures. When the t parameters of a corresponding data pair and data triplet are not equal, the t parameter of the data pair is assumed equal to the t parameter of the data triplet. A new v parameter value is calculated using linear interpolation in time (or extrapolation when needed) using the v parameters of two data pairs. The two data pairs closest in time to the triplet are used. This new v parameter value is then used in the calculation of the average v parameter of the data triplet.

The msd parameters represent the mean square deviation of the values used to compute the average values. The msd parameters characterize the variability of each data triplet and are used as weighting values when computing the nearness of a match.

The middle section substructures 412, 422, and 432 each contain at least nine parameters.
1. The minimum-v parameter (IM-minimum-v, PM-minimum-v, and RM-minimum-v)—the minimum value of the corresponding minimums of the associated instance structures
2. The average v parameter (IM-average-v, PM-average-v, and RM-average-v)—the average value of the corresponding averages of the associated instance structures
3. The maximum v parameter (IM-maximum-v, PM-maximum-v, and RM-maximum-v)—the maximum value of the corresponding maximums of the associated instance structures
4. The minimum duration parameter (IM-minimum-duration, PM-minimum-duration, and RM-minimum-duration)—the minimum duration of the corresponding durations of the associated instance structures
5. The average duration parameter (IM-average-duration, PM-average-duration, and RM-average-duration)—the average of the corresponding durations of the associated instance structures
6. The maximum duration parameter (IM-maximum-duration, PM-maximum-duration, and RM-maximum-duration)—the maximum duration of the corresponding durations of the associated instance structures
7. The minimum period parameter (IM-minimum-period, PM-minimum-period, and RM-minimum-period)—the minimum period of the corresponding periods of the associated instance structures 8. The average period parameter (IM-average-period, PM-average-period, and RM-average-period)—the average of the corresponding periods of the associated instance structures
9. The maximum period parameter (IM-maximum-period, PM-maximum-period, and RM-maximum-period)—the maximum period of the corresponding periods of the associated instance structures The period parameters are set to zero if there is no periodic variation in the parameters during the middle section of the on-off cycle. If there is periodic variation, then the period parameter is the number of samples between the beginnings of each periodic variation. For chaotic variation, the period parameter is about equal to the duration parameter.

If there is periodic or chaotic variation, then the middle section also contains a variable length list of N data triplets (IM1(v, t, msd), IM2(v, t, msd) ..., IMN(v, t, msd); PM1(v, t, msd), PM2(v, t, msd) ..., PMN(v, t, msd); and RM1(v, t, msd), RM2(v, t, msd) ..., RMN(v, t, msd)) that represent the variation. These data triplets are consolidated from the corresponding data pairs in the associated instance structures 300 by the same process used for the start section and described in the forgoing.

The end sections of the substructures 413, 423, and 433 contain a variable length list of N data pairs IE1(v, t, msd), IE2(v, t, msd) ..., IEN(v, t, msd); AE1(v, t, msd), AE2(v, t, msd) ..., AEN(v, t, msd); and RE1(v, t, msd), RE2(v, t, msd) ..., REN(v, t, msd). These data triplets are consolidated from the corresponding data pairs in the associated instance structures 300 by the same process used for the start section and described in the forgoing.

Figure 5:
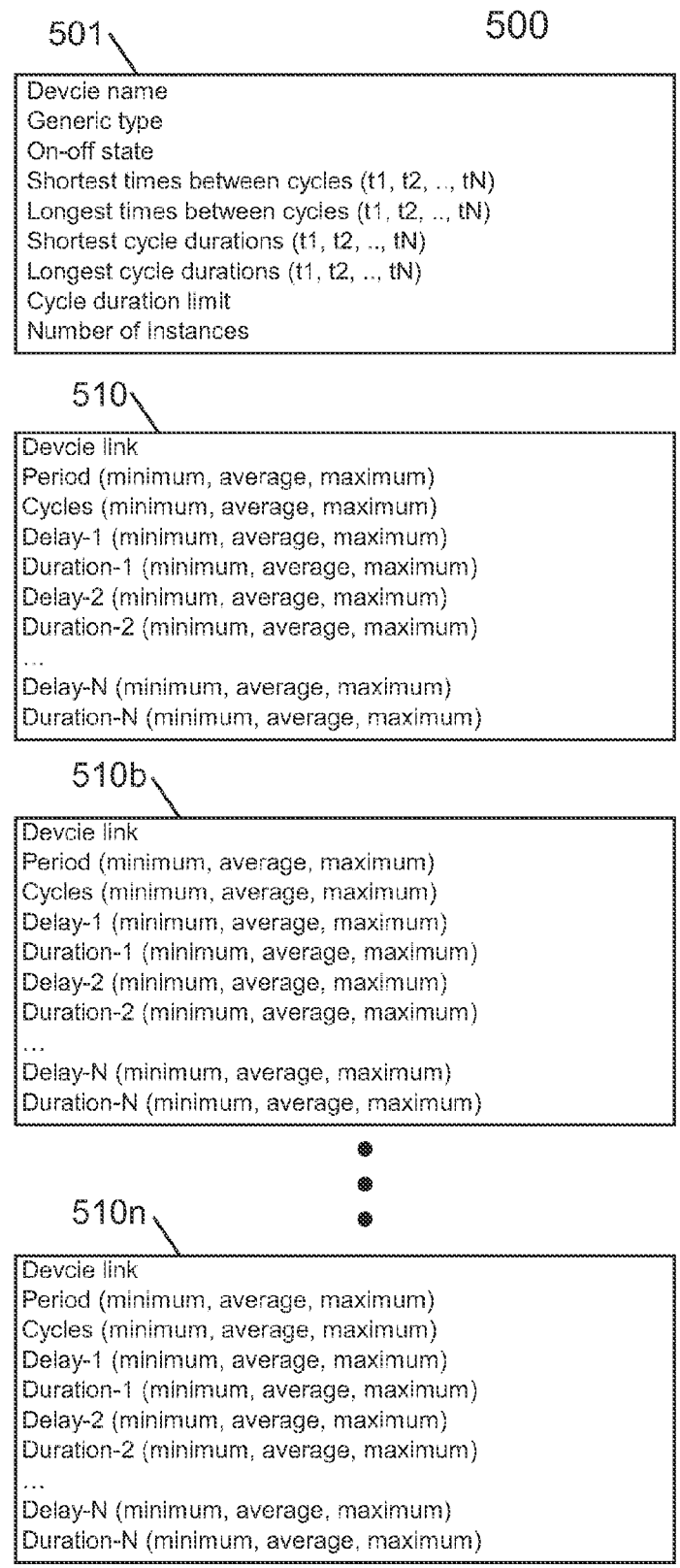
FIG. 5 illustrates the data structure used to store the characterization of a composite electrical device. A composite structure represents the combined behavior of two or more electrical devices.

FIG. 5 illustrates the composite data structure 500 used to store the characterization of on-off cycles of an electrical device composed of multiple electrical devices represented by device structures 400 and/or to characterize behaviors that can not be represented by the device structure 400. Composite devices are identified by self-correlating and cross-correlating in time all instance structures 300 using processing represented by the flow diagram of FIG. 13 and described below. The composite structure is used to help associate low confidence instance structures to the appropriate device structures. It is also used to simplify and make more understandable the information presented to the consumer.

The composite structure 500 has substructure 501, which is similar to substructure 401. Substructure 501 characterized the high level behavior of an on-off cycle and contains the following parameters:
1. Device name—the name used when producing reports for the consumer. The name is generated automatically based on generic behavior and can be changed by the consumer.
2. Generic type—the closest match to the behavior of electrical devices provided in a predetermined library of device descriptions.
3. On-off State—the operating status of the composite device, set to on if the On-off state of any associated device structure is set to on. It is set to off after a time determined by parameters in the subsections 510, 510b, ..., 510n described in the following.
4. Shortest times between cycles—a list of N values (t1, t2, ..., tN) representing the shortest times between on-off cycles associated with this composite device.
5. Longest times between cycles—a list of N values (t1, t2, ..., tN) representing the longest times between on-off cycles associated with this composite device.
6. Shortest cycle durations—a list of N values (t1, t2, ..., tN) representing the shortest durations on-off cycles associated with this composite device.
7. Longest cycle durations—a list of N values (t1, t2, ..., tN) representing the longest
8. Cycle duration limit—the maximum duration of any on-off cycle for this composite device. The value is determined from the history of activity and is used to reject the association of low confidence instance structures with excessive durations.
9. Number of cycles—the number of composite on-off cycles used to characterize this composite device.

The composite structure 500 has a variable number of substructures 510. Each device structure 400 that is associated with this composite device has a corresponding substructure 510. Substructure 510 has the following parameters:
1. Device link—the link to a specific devices structure 400
2. Period (minimum, average, maximum)—a data triplet representing the minimum, average, and maximum periods between repetitive on-off cycles. These values are set to zero if the on-off cycle pattern is not repetitive.
3. Cycles (minimum, average, maximum)—a data triplet representing the minimum, average, and maximum number of on-off cycles of the device in each on-off cycle of the composite device. These values are set to one if the on-off cycle is not repetitive.
4. Delay-1 (minimum, average, maximum)—a data triplet representing the minimum, average, and maximum time delay between the start of the composite device on-off cycle and the first on-off cycle of the device.
5. Duration-1 (minimum, average, maximum)—a data triplet representing the minimum, average, and maximum duration of first on-off cycle of the device.

If the device makes multiple on-off cycles that are not repetitive, then substructure 510 includes additional pairs of Delay and Duration data triplets, one pair for each of N on-off cycles:
6. Delay-2 (minimum, average, maximum)—a data triplet representing the minimum, average, and maximum time delay between the start of the composite device on-off cycle and the first on-off cycle of the device.
7. Duration-2 (minimum, average, maximum)—a data triplet representing the minimum, average, and maximum duration of first on-off cycle of the device.
9. Delay-N (minimum, average, maximum)—a data triplet representing the minimum, average, and maximum time delay between the start of the composite device on-off cycle and the first on-off cycle of the device.
10. Duration-N (minimum, average, maximum)—a data triplet representing the minimum, average, and maximum duration of first on-off cycle of the device.

Figure 6:
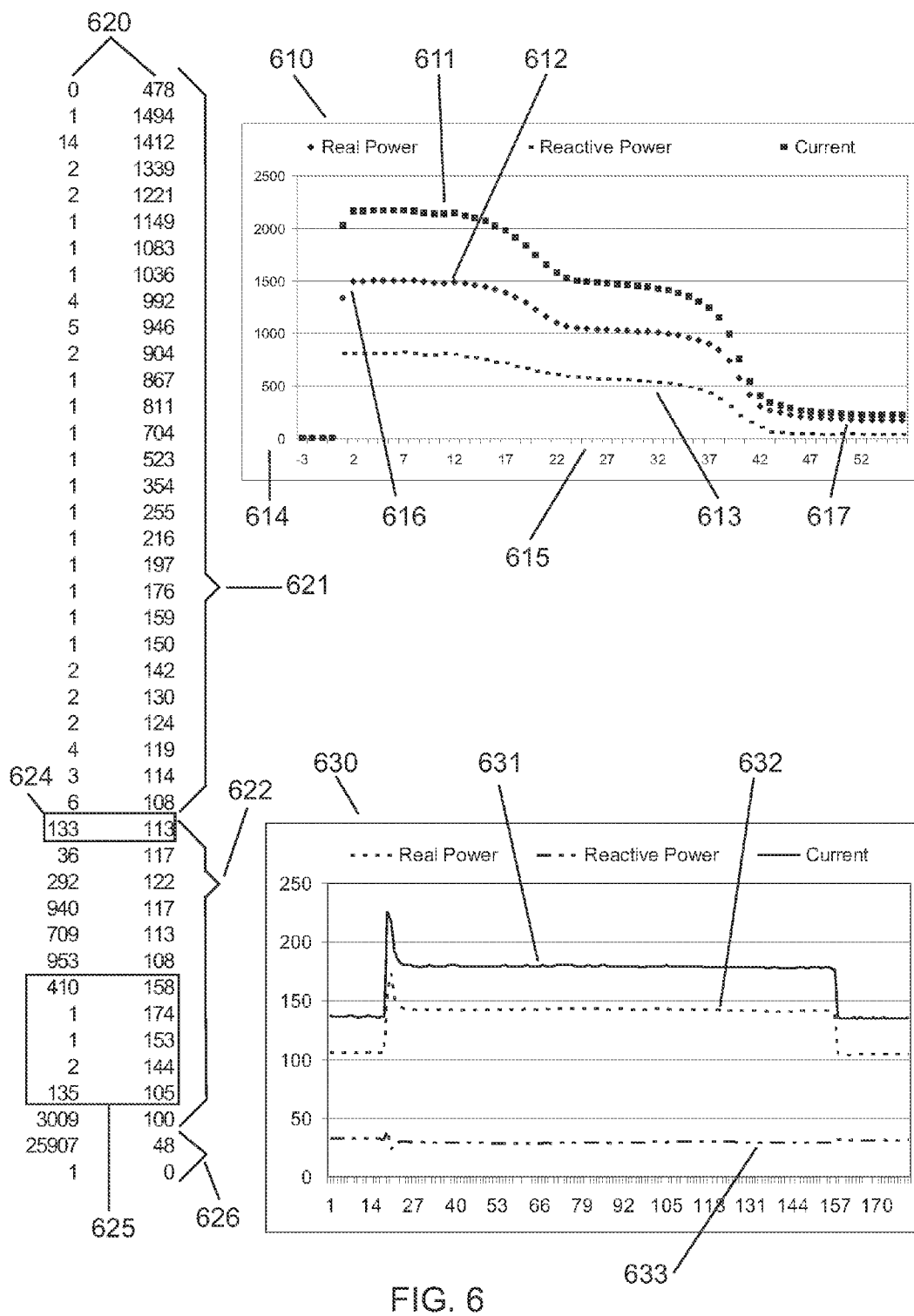
FIG. 6 illustrates the electrical parameters for a portion of an on-off cycle of a refrigerator and a complete on-off cycle of a refrigerator light.

FIG. 6 illustrates an on-off cycle instance of a refrigerator. Graph 610 plots the values of samples of the current 611, real power 612, and reactive power 613 during the start section of the cycle. The vertical scale 614 is in watts and is applicable to the real power and reactive power. The current is arbitrarily scaled so that it can be shown in the same graph. The horizontal scale 615 is the sample numbers. The start section begins with the step change event at sample 0, the first sample larger than the stable base value. Sixty samples of the start section are shown, equivalent to one second.

The real power at the start 616 is nearly 10 times larger then the real power one second after the start 617. The power factor at the start 616 is approximately 0.5. The power factor at the end 617 is approximately 0.25.

620 is the complete set of data pairs used to determine the parameter values in the real power subsection 320 of the instance structure 300. The values in the left column are the number of samples between data pairs and values in the right column are the values of the real power. The predetermined threshold value difference between data pairs is 4%. The data pairs identified by bracket 621 determine the start section 321.

The data pairs identified by bracket 622 determine the middle section 322. The transition from the start section to middle section is determined by the stability of the real power. Data pair 624 is 133 samples after the preceding data pair, indicating the power usage is relatively stable at 113 watts.

The data pairs enclosed by box 625 indicate step change events occurred during a portion of the middle section. Graph 630 shows 180 samples of current 631, real power 632, and reactive power 633 at the time represented by the data pairs enclosed by box 625. Graph 630 represents an on-off cycle of a 40 Watt incandescent light. A positive step change event occurred at the start. The light was on for approximately 138 samples or 2.3 seconds. A negative step change event occurred at the end. The method used to separate the incandescent light on-off cycle from the refrigerator on-off cycle is described below in the disclosure associated with FIG. 9.

The data pairs identified by bracket 626 represent the negative step change event of the end section of the refrigerator. After 25907 samples of stable operation (approximately 7.2 minutes) using approximately 100 watts (+/−4 watts), the on-off cycle ended by going to zero power within two samples.

The stable base value was determined by averaging a number of samples just before the start of the cycle and a number of samples just after the end of the cycle. These average values were essential equal. There were two step change events during the refrigerator on-off cycle caused by a complete on-off cycle of the incandescent light. The incandescent light on-off cycle has no effect on the refrigerator on-off cycle since the stable base value was essentially the same before and after this on-off cycle. Therefore the stable base value was constant and independent of any other on-off cycle, so this instance structure 300 extracted from this data has the maximum value for Measurement confidence.

The incandescent light on-off cycle is represented by a separated instance structure 300, which will also have the maximum value for Measurement confidence. The stable base value used for its determination is not affected by another on-off cycle.

The Measurement confidence value would be reduced for both instance structures if the incandescent light on-off cycle had a longer duration and occurred near the beginning of the middle section of the refrigerator on-off cycle. The variations in the electrical parameters could be caused by either or both devices, so the stable base value is not accurately determined. The instance structures would be associated with their corresponding device structures 400, but they would not be used to characterize the device structures.

FIG. 7 shows two substructures of the specific instance structure 700 which uses instance structure 300 to represent the specific refrigerator on-off cycle illustrated in FIG. 6. Some of the parameter values in substructure 701 are determined in near real time as the on-off cycle progress, and some are determined later when the instance is associated with a device structure 400. The Service leg is determined at the start of the cycle; in this case Leg A. The Turn on time and Turn off time is stored in a format that includes the day of the year (day 312) and the hour (1 am), minute (23 for Turn on time), and second (17 for Turn on Time) when the events occurred.

The parameter State A indicates the processing status of data extraction and associating the instance structure with a device structure. State A has various values while the data representing the complete on-off cycle is being extracted from the electrical parameter data. State A is set equal to 1 when extracting the representation is complete and the instance structure is ready for the associating process.

The On-off state is set to off since the instance structure represents a complete on-off cycle.

There were no unexpected step change events during the start section, so Start SCE count is zero. The refrigerator light on-off cycle produced two step change events during the middle section. Step change events that occur at the same time in the current, real power, or reactive power are not counted multiple times. Therefore the value of Middle SCE count is 2.

The four Voltage parameters are extracted from the electrical parameters at the appropriate times. In this case, the supply voltage was essentially constant during the on-off cycle.

The Measurement confidence is 1.00, the maximum value. As described in the foregoing, the confidence is set to maximum because the stable base value, the start section, and end section were not affected by any other on-off cycle.

FIG. 7 shows a portion of the instance structure extracted for the refrigerator on off cycle illustrated in FIG. 6. The Real power substructure 720 is shown. The data for the Current substructure and Reactive substructure has similar properties. The Start section 701 contains the data pairs identified by bracket 621 shown in FIG. 6. There are 28 data pairs in the list. The PS-duration value is 63, the sum of the t values of the data pairs in the start section.

The five parameters in the Middle section 722 are determined by the electrical parameter data that occurs after the Start section and before the End section. Values for PM-minimum-v, PM-average-v, and PM-maximum-v are determined by the difference between the measured total power and the stable base value. Therefore, values that occur when the stable base value is affected unpredictably by other on-off cycles are not considered when determining these values. PM-minimum-v is 100 (watts), the smallest value of real power attributed to this on-off cycle during the middle section. PM-average-v is 103 (watts), PM-maximum-v is 122 (watts), and PM-duration is 543 seconds. The total power used during the Middle section is determined using PM-average-v and PM-duration.

There is no periodic variation during the Middle section, so PM-period is 0. However, the power does continue to change significantly (by about 20%) at a slow rate during the middle section. These variation are represent by the 10 data pairs PM1(t, v) through PM10(t, v). During the first 60 seconds immediately after the Start section, the power increase from about 108 watts to about 122 watts, then decreases to about 105 watts. The power then decreases at a very slow rate to about 100 watts at the end of the on-off cycle.

The end section 723 contains 3 data pairs. The power goes from 100 watts, to 48 watts, to 0 watts in successive samples. This end section behavior is typical of most electrical devices.

All parameter values of this instance structure representing the refrigerator on-off cycle are independent of the on-off cycle of the incandescent light the occurred during its middle section. The effects of the incandescent light on-off cycle are removed by the process represent by FIG. 10 and disclosed in the following.

Figure 8:
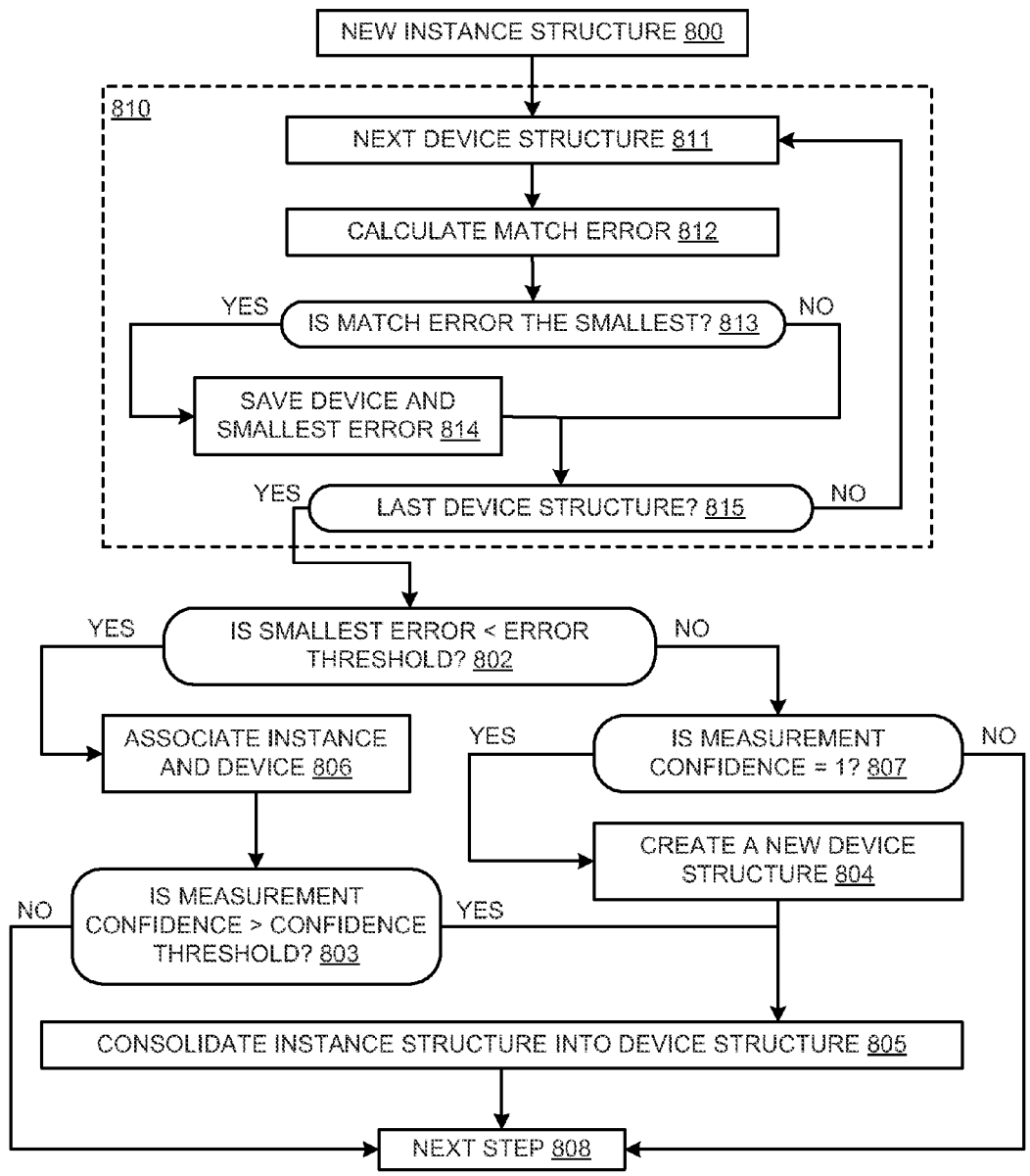
FIG. 8 is a flow diagram of the process of matching a newly extracted instance structure to an existing device structure or using a well determined instance structure to create a new device structure.

FIG. 8 is a flow diagram of the process used to consolidate instance structures 300 into device structures 400. This process can be done any time after the on-off cycle is complete and the instance structure 300 is available. The process begins at 800 with a new unassociated instance structure. Box 810 encloses the steps of calculating the match error value for the instance device 300 with each existing device structure 400, and saving a reference to the device structure that produces the smallest match error.

Figure 9:
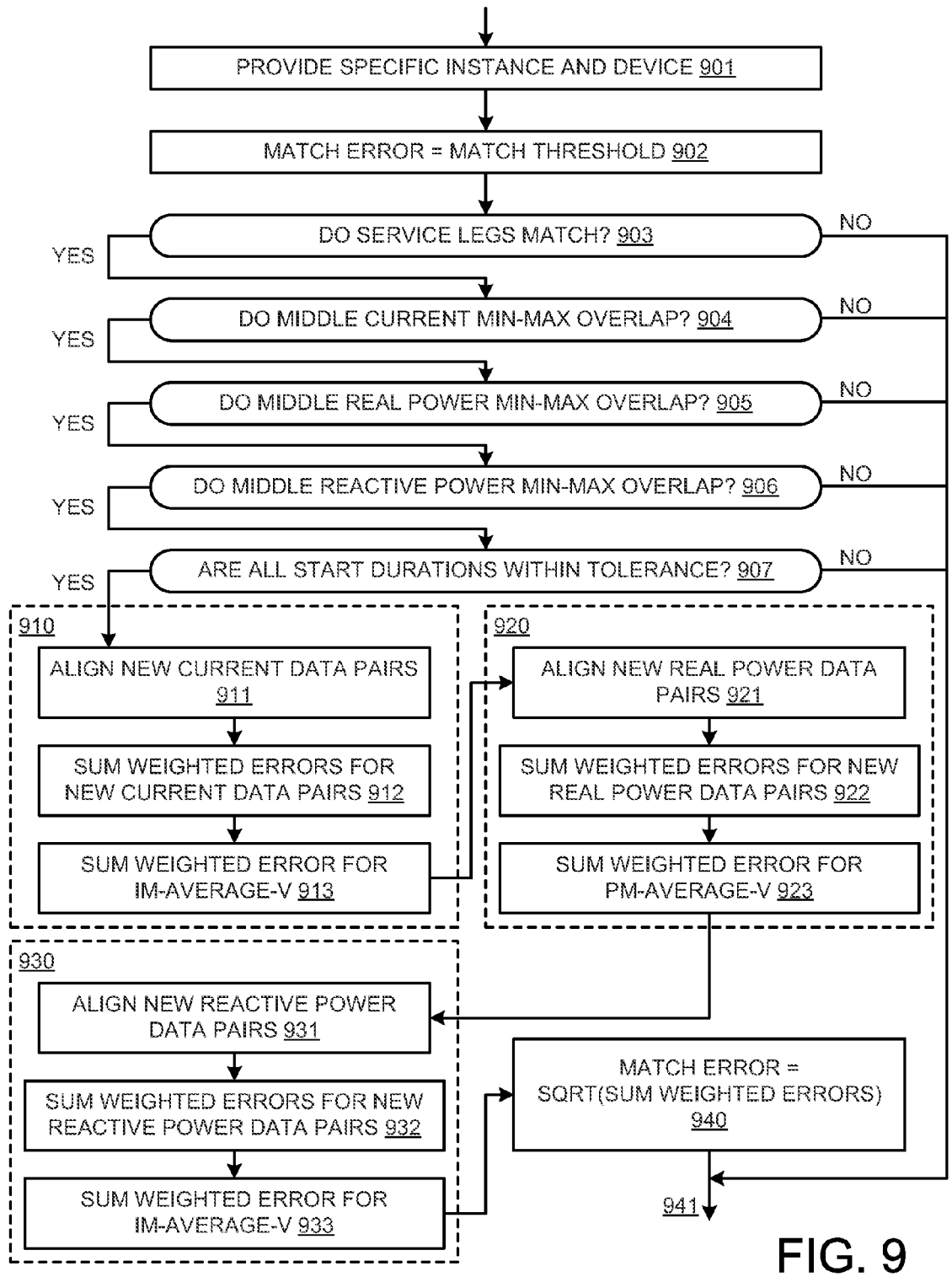
FIG. 9 is a flow diagram of the process used to determine the match error between an instance structure and a device structure.

Step 811 provides the next device structure for comparison. Step 812 calculates a match error value that represents the closeness of the match. The value is zero for a perfect match. FIG. 9 is a flow diagram of the process that calculates this match error and is disclosed in the following.

Step 813 compares the new match error value with the smallest previous match error value. Step 814 saves the smallest match error value and the reference to the corresponding device structure. Step 815 determines if all of the device structures have been tested. If the there are more device structures, the next step is 811. After all device structures are tested, the next step is 802.

Step 802 compares the smallest match error to a predetermined match error threshold. If the match error is less than the threshold, then step 806 associates the instance structure with the device structure that had the smallest match error. Step 800 sets the initial match error value to the match error threshold. If there are no existing device structures, then the NO branch of step 802 is processed.

If the match error is equal to or greater than the error threshold, then the instance structure does not match any existing device structure. Step 803 tests the Measurement confidence. If the Measurement confidence is equal to 1, then a new device structure is created in step 804 to represent the instance structure. Step 805 consolidates the new instance structure into the device structure created in step 804. If the confidence is not equal to 1, then the process ends with next step 808. This instance structure is saved for further processing at a later time.

Step 807 compares the Measurement confidence to a predetermined confidence threshold and if greater, then the instance structure is consolidated into the device instance that produced the smallest match error. This test ensures that only instance structures that are accurately determined are used to characterize device structures. If the confidence is insufficient, the process ends with next step 808.

FIG. 9 is a flow diagram of the process used to calculate the match error represented by step 812 in FIG. 8. The process begins with step 901 that provides references to a specific instance structure 300 and a specific device structure 400. Step 902 sets the match error to the match threshold so the default match error value indicates there is no match. Steps 903 through 907 are simple tests that quickly exclude a match. For the device structures characterizing devices found in a typical home, more than 90% are excluded by these simple tests.

Step 903 compares the Service legs and exits to 941 if they are not the same.

Step 904 tests for overlap of the minimum and maximum values of the Current middle section. There is overlap if IM-minimum-v of the instance structure is less than IM-maximum-v of the device structure or if IM-minimum-v of the device structure is less than IM-maximum-v of the instance structure. If this test fails, then step 904 exits to 941.

Step 905 tests for overlap of the minimum and maximum values of the Real power middle section. There is overlap if PM-minimum-v of the instance structure is less than PM-maximum-v of the device structure or if PM-minimum-v of the device structure is less than PM-maximum-v of the instance structure. If this test fails, then step 905 exits to 941.

Step 906 tests for overlap of the minimum and maximum values of the Reactive power middle section. There is overlap if RM-minimum-v of the instance structure is less than RM-maximum-v of the device structure or if RM-minimum-v of the device structure is less than RM-maximum-v of the instance structure. If this test fails, then step 906 exits to 941.

Step 907 tests that the durations of the start sections (IS-duration, PS-duration, and RS-duration) are the same within a predetermined tolerance. A typical tolerance of 50% prevents attempting to match start sections that are significantly different. If the start durations are not within the predetermined tolerance, then step 907 exits to 941.

The steps contained in boxes 910, 920, and 930 are similar. An error value is calculated for each data triplet in the start sections of the device structure. Steps 911, 921, and 932 align the data pairs in the instance structure start sections with the corresponding data triplets in the device structure start sections. The alignment process first creates one new data pair for each data triplet. The t value of each new data pair is set equal to the number of samples since the first data triplet, which is the sum $\Sigma$ t of the previous t values. The corresponding value of $\Sigma$ t is calculated for each instance data pair. Generally, the $\Sigma$ t value of the new data pairs will not match the $\Sigma$ t value of the instance data pairs. The v values for the new data pairs are calculated using linear interpolation (or extrapolation) of the v values from the two instance data pairs that have $\Sigma$ t values closest to the $\Sigma$ t value of the new data pair. After this alignment process, the v values of the new data pairs and the v values of the data triplets represent the same sample time after the beginning of the start section.

In steps 912, 922, and 932 the v values from the new data pairs are used with the corresponding v values from the data triplets to calculate a weighted error value WEV for each data pair. These WEV are then added together to produce a weighted sum. The WEV for each data pair is calculated using the formula:

$$WEV=((v_t-v_p)/(|v_t|+|v_p|+k))^2/msd$$

In this formula, $v_t$ is the v value from the data triplet, $v_p$ is the v value from the new data pair, and msd is the msd value from the data triplet. This formula is similar to that used for standard normalized RMS error calculations where the difference is normalize by the magnitude of the values and then squared. The parameter k is a predetermined constant that effectively reduces WEV when comparing small values. Smaller values have relatively larger uncertainties due to measurement noise. The parameter k effectively makes the match error value have consistent meaning when matching devices that use power in the range from approximately 20 watts to more than 5000 watts. Typical values of k are in the range of 10 to 100, depending on the measurement uncertainty of the electrical parameters. The absolute values of $v_t$ and $v_p$ are used in the denominator because reactive power may be positive or negative.

The msd parameter is used to scale the error value so that WEV for highly variable values are appropriately reduced. Typically the electrical parameters for the first two AC cycles of the start section are highly variable, depending on the relative phase of the control switch and the AC cycle. For example, if the on-off switch is closed when the AC voltage is zero, the initial surge current and power is smaller. However, if the switch is closed when the AC voltage is at its maximum, then the initial surge current and power is larger. This effect is typically larger for lower power devices.

As the WEV are accumulated, the values of the l/msd weighting are separately accumulated. The accumulated weighting value is used to normalize the final match error so its value is independent of the total number of data triplets used in the match error calculation.

Steps 913, 923, and 933 calculate WEV for the middle section –M-average-v values. The start section and middle section are about equally important when associating an instance structure 300 with a device structure 400. Therefore these WEV are additionally weighted by the number N of data triplets in the start section. A value equivalent to msd for average-v is calculated using the minimum-v and maximum-v values. The WEV is calculated, multiplied by N and then added to the sum of the WEV for the new data pairs. The value of the weighting factor 1/msd is multiplied by N and added to the sum of the other values of 1/msd.

Step 940 calculates the match error using the equation:

$$\text{match error} = \text{square-root}(\Sigma WEV/\Sigma(1/msd))$$

The match error value is always less than one since the value of each WEV is less than one and the value of each 1/msd is greater than one. Therefore the sum of all WEV is less than N which is divided by a number greater then N. The process ends at 941.

The many instance structures that contain no step change events in their start section can be correctly associated with a device structure using only the start section data. Near real time status reporting is provided by using a portion of the process illustrated in FIG. 9 to associate an incomplete instance structure with a device structure.

For this case, steps 913, 923, and 933 are skipped since there is no data for the middle section of the partial instance structure. After the data for the start sections is determined for an instance structure, a preliminary match error is calculated for each device structure. The instance structure is preliminarily associated with the device structure with the smallest match error less than the predetermined match error threshold. This preliminary association is used to set the On-off state parameter of the device structure to the on state. When the on-off cycle completes, the On-off state parameter is set to the off state. The final association of the complete on-off cycle instance structure is made by the process described in the following.

Figure 10:
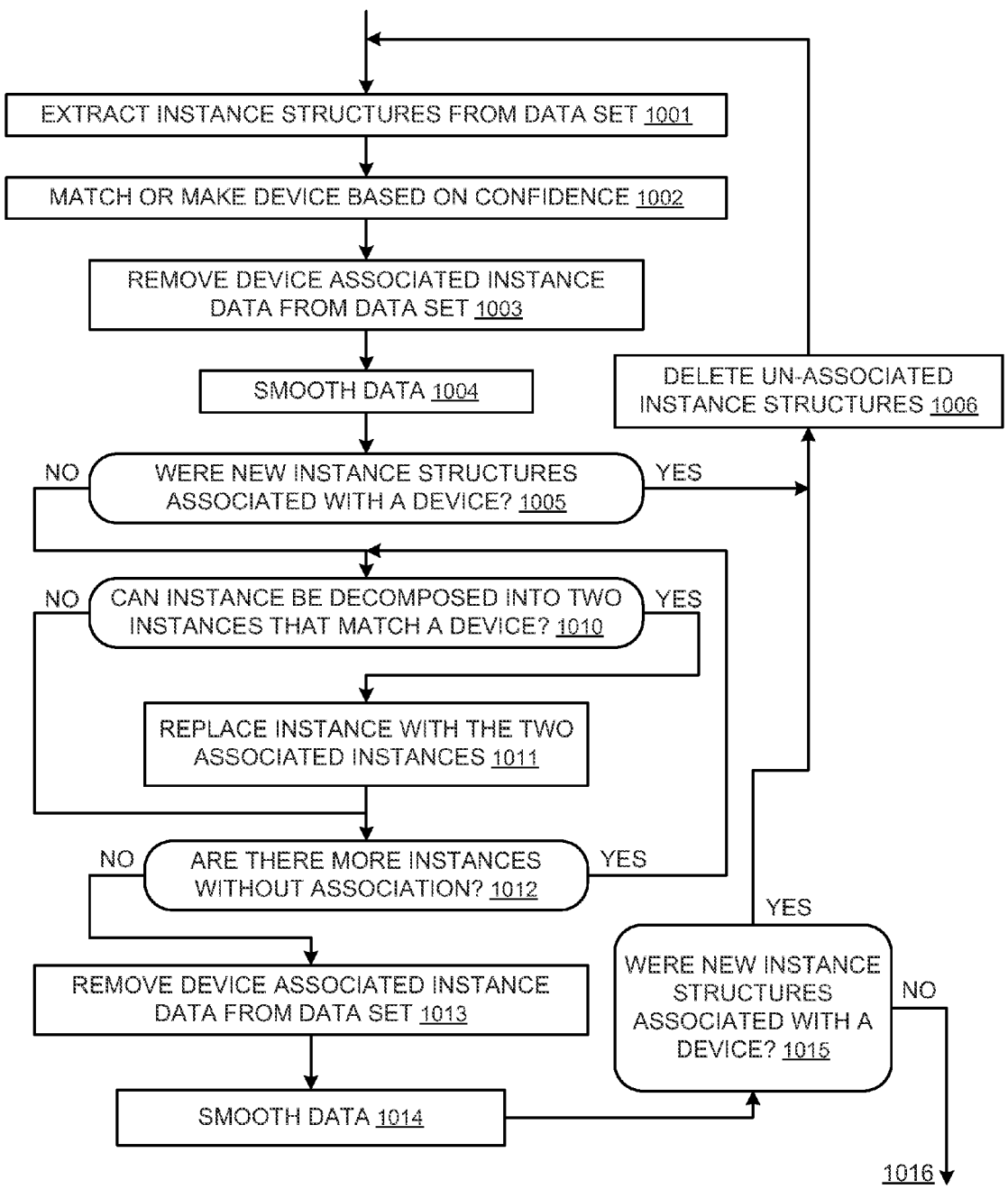
FIG. 10 is a flow diagram of the iterative process that extracts instance structures from the data set, associates instance structures with device structures, and removes the contributions of the instance structures from the data set.

FIG. 10 is a flow diagram of the process used to extract multiple instance structures 300 and multiple device structures 400 from a large set of stored electrical parameter data generated by the device illustrated in FIG. 1. The process operates on a large data set of electrical parameters stored in a large random access memory with sufficient capacity to store approximately one year of data. A memory of different size and/or different implementation may also be used. These electrical parameters typically include voltage, current, real power, and reactive power for each leg of the electrical service. Other parameters such as power factor, apparent power, and harmonic content in various combinations could also be used. This disclosure anticipates other such parameters and combinations. The specific examples used should not be construed to limit the scope of this application.

The total extraction process requires significant compute power and processing time and is therefore designed to operate as a low priority background process.

The process begins with step 1001 that extracts complete on-off cycle instance structures from the data set. FIG. 11 is a flow diagram of the steps of this extraction process and is described in the following.

Step 1002 represents the process illustrated in FIG. 8 and described in the foregoing. Device structures 400 are created to represent instance structures with Measurement confidence value equal to one. Other instance structures with smaller Measurement confidence values are associated with existing device structures if the match is sufficiently close. The values from instance structures with high Measurement confidence are consolidated into their associated device structure so that device behavior variations are appropriately characterized.

In step 1003 the v values of each instance structure associated with a device structure are subtracted from the values in the data set. The subtraction is done sample by sample. Variations in the data set values are reduced as each instance structure is subtracted from the data set. For the parts of the on-off cycle with stable behavior and where the stable base value is well determined, this subtraction is equivalent to setting the data set values to the stable base value for that corresponding part of the on-off cycle. For the parts of the on-off cycle instance structure where the stable base value is not well determined due overlaps with other on-off cycles, values for each sample are generated using information from the associated device structure. These values are then subtracted from the data set values.

As an example, consider the incandescent light on-off cycle illustrated in FIG. 6. Since there are no step change events during its on-off cycle and the middle section of the refrigerator on-off cycle is stable, the data set values can be set to values determined by a straight line connecting the stable base values before and after the incandescent light on-off cycle. For this case, the v values in the data pairs of the incandescent light instance structure are not needed to remove its contribution from the data set.

In step 1004, the data set sample values are checked for artificial variations created by subtracting data generated using device structure information. Since the device structure is typically the consolidation of many instance structures, the values generated from its information may be slightly different than the values of any one specific instance structure. The data set values are adjusted to minimize sample to sample variations in the rate of change. The amount of adjustment for each sample is limited to variability indicated by the corresponding msd value for the generated value. This adjustment smoothes the data set values and eliminates artificial step change events that could be detected during subsequent processing.

Step 1005 controls a reprocessing loop. If step 1002 associated at least one new instance structure with a device structure, then processing step 1006 deletes all unassociated instance structures and the modified data set is reprocessed. Eliminating the variations in the data set values due to the associated instance structures usually makes it possible to extract additional instance structures than can be associated with device structures.

The number of device structures typically grows as the data set grows and as the data set is reprocessed after removing on-off cycles. Therefore it is more likely that an instance structure can be associated with a device structure. The number of device structures will reach a limit as the data set grows to include multiple on-off cycles of each electrical device in the home.

Figure 12:
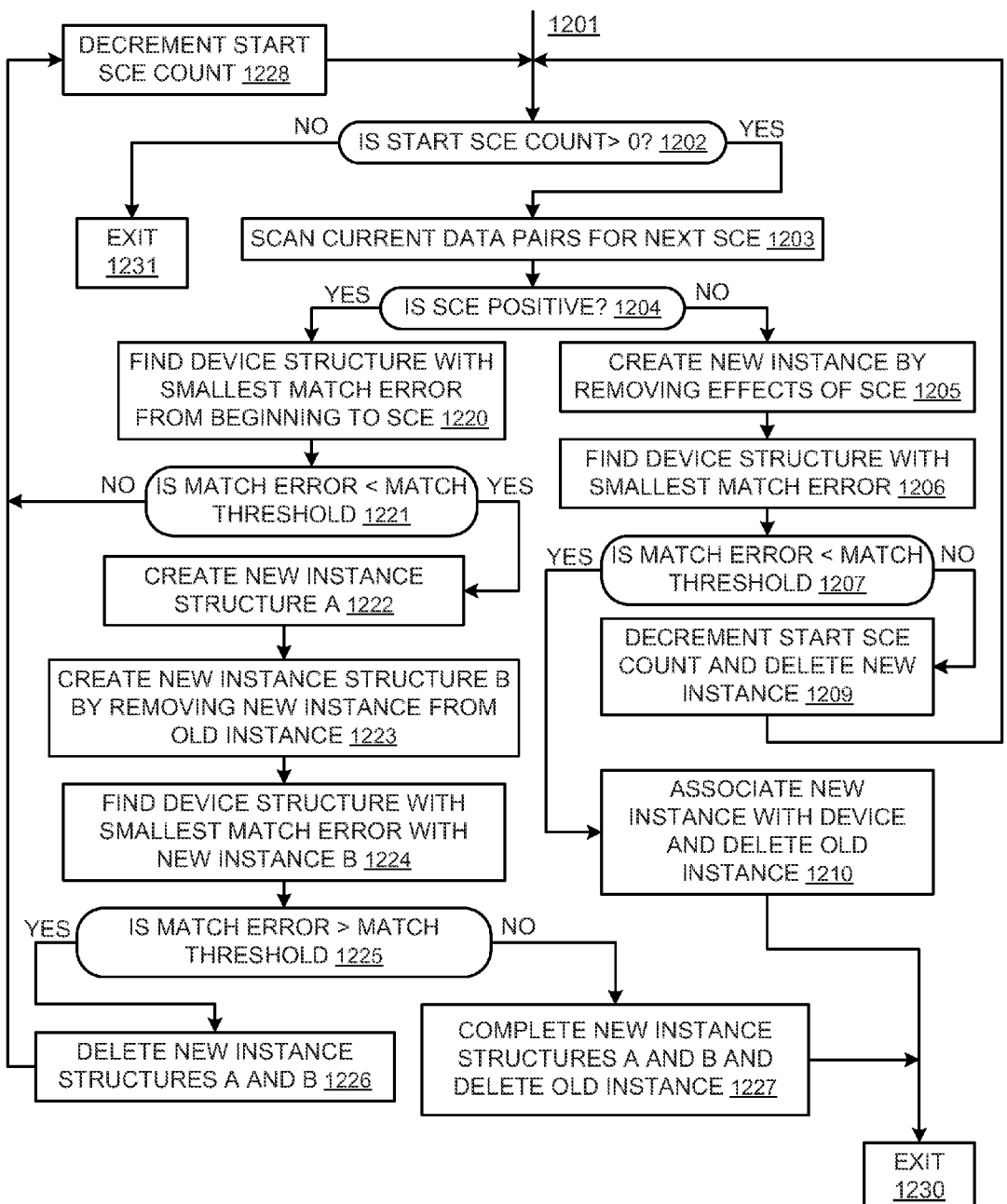
FIG. 12 is a flow diagram of the process used to decompose unassociated instance structures into two separate instance structures that are associated with device structures.

If no new instance structures were associated with device structures, then step 1010 attempts to decompose each unassociated instance structure into two instance structures, each generated using a corresponding device structure. FIG. 12 is a flow diagram of the process used to decompose the unassociated instance structures and is described in the following. If an unassociated instance structure can be decomposed into two associated instances structures, then step 1011 deletes the unassociated instance structure and replaces it with the associated instance structures.

Step 1012 continues the processing flow until decomposition is attempted for all unassociated instance structures. Step 1013 removes the contributions of newly created associated instance structures from the data set values and step 1014 smoothes the data set values. Steps 1013 and 1014 are essentially the same as steps 1003 and 1004 described in the foregoing.

Step 1015 tests if new associated instance structures were created by the decomposition of step 1010 and step 1011. If new instances structures were created, then the remaining unassociated instance structures are deleted in step 1006 and the modified data set is reprocessed. If no new associated instance structures were created, then the process ends at 1016.

Removing the contributions of instance structures from the data set makes it possible to extract associated instance structures of lower power device and of device that have slow rates of change during their start and end sections. The extraction process of 1001 and FIG. 11 is adjusted to be more sensitive as on-off cycles are removed form the data set.

The unassociated instance structures that remain after the processing of FIG. 10 could represent many different types of occurrences. The following are examples of possibilities:
1. There is no matching device structure because no instance structure with high Measurement confidence was extracted for the device. There could be several instance structures with low Measurement confidence that match each other. A high confidence instance structure may be extracted at a later time as additional data is processed, thereby creating a device structure that matches these instance structures.
2. The combination of three or more separate instances structures.
3. The match error is greater than the match threshold because the voltage dependent scale factors are not properly determined. This may be corrected as more data is processed that includes instance structures occurring at different voltages.
4. A unique event caused by a bouncing control switch or intermittent connection as a device is plugged in.
5. A unique event cause by the failure of an electrical device.
6. A unique event caused by variations in the electrical service.

In general, a larger percentage of the instance structures can be associated with device structures as the data set becomes larger. Therefore a larger percentage of the total power used in the home can be associated with device structures. However, it is likely that a portion of the power used can not be assigned to a device. For example, some electronic devices consume power when plugged in but not actually turned on. This power consumption is continuous and never generates a complete on-off cycle.

Figure 11:
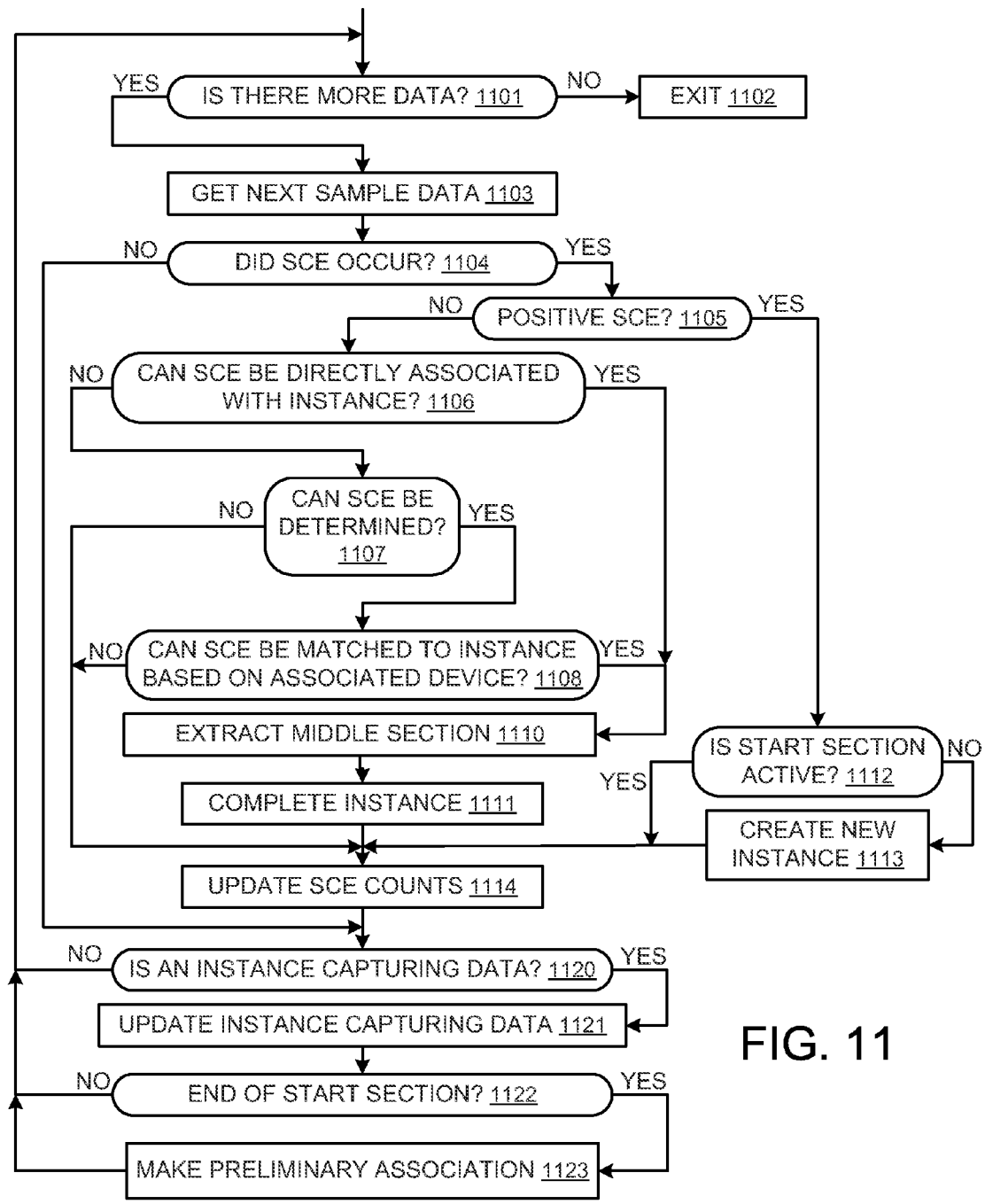
FIG. 11 is a flow diagram of the process that makes preliminary associations of incomplete instance structures to device structures so that the power use rate and status of multiple electrical devices can be reported to the consumer in near real time.

FIG. 11 is a flow diagram of the process used to extract the instance structures from the data set. This is the processing represent by step 1001 in FIG. 10. Step 1101 tests if there is another sample in the data set, and exits at 1102 when there is no more data. Step 1103 gets another sample of the electrical parameters from the data set.

Step 1104 detects step change events (SCE) in the data samples of the current electrical parameter. It is sufficient to process only the current electrical parameter for step change events. A step change in current has an associated simultaneous step change in real power and usually also in reactive power. A step change in real power causes a step change in current. It is possible that a simultaneous step change in real power and reactive power has no corresponding step change in current. However, this rare case does not occur is a way that significantly affects the extraction and characterization of instance structures.

A step change event occurs when there is a relatively large change in the rate of change (ROC) of the current samples. This is the digital equivalent of the second derivative of the current. The ROC is calculated using a number of samples that depends on the time scale of interest. For the shortest time scale, the ROC is the difference between two successive sample values. For longer time scales, the ROC is determined for two successive groups of N successive samples. For each group of N samples, linear least squares regression is used to determine the slope of the linear equation that best fits the set of N samples. The slope of this linear equation is the ROC. A step change event occurs when $|ROC_1|$>Change threshold or $|ROC_2|$>Change threshold and $|(ROC_1-ROC_2)|/(..ROC_1|+|ROC_2|)$>ROC threshold To prevent excessive false detection of step change events caused by noise from various sources, at least one of the ROC values must exceed a predetermined Change threshold. The values of the Change threshold and the predetermined ROC threshold are chosen to balance preventing false step change events during the typical variation of the start section versus not detecting step change events caused by the overlap of on-off cycles.

The value of N and the value of ROC threshold are adjusted during the processing represented by step 1001 in FIG. 10. As instance structures are removed from the data set, fewer step change events are detected when the data set is reprocessed. The process that detects step change events increases the value of N and decreases the values of Change threshold and ROC threshold as the number of detected step change events in the data set approaches zero.

Step 1105 tests the sign of the detected step change event. Each and every instance structure is initiated by a positive step change event. However, some instance structures include multiple step change events, especially during the start section. Step 1112 tests if there is currently an instance structure extracting values for its start section. If there is an active start section, then the step change event is included in that start section. Step 1114 then increments either the Start SCE count or Middle SCE count of each active instance structure. The value of State A is used to track the extraction status of each instance structure.

If there is no active start section, the step 1113 creates a new instance structure and determines some parameters. The determined parameters in substructure 301 include Service Leg, Turn on time, Voltage before turn-on, Voltage after turn on, State A, and the On-off state. The stable base value is determined using data samples before the initiating step change event. The stable base value is then used to determine the v values for $IS1(0, v)$, $PS1(0, v)$ and $RS1(0, v)$ in substructures 310, 320, and 330 respectively. The stable base value is assumed to be constant during the duration of the start section.

Variations in the data set values are always captured in the active instance structure that has the most recent Turn on time. For the example of FIG. 6, the incandescent light instance structure captures the variations in the data set while it is in the on state. The values for the refrigerator instance structure are assumed to be essentially constant during on-off cycle of the incandescent light. After the incandescent light instance structure completes, the refrigerator instance structure again captures the variations in the data set values.

When the step change event is negative, step 1106 determines if the step change event can be directly associated with an instance. Direct association occurs when there are no other step change events between the initiating positive step change event and this negative step change event and if the stable base value is essential the same before and after the two step change events. When there is direct association, steps 1110 and 1111 extract information from the data set to completely determine the instance structure.

When the step change event can not be directly associated with an instance structure, step 1107 attempts to accurately determine the step change event. Accurate determination requires that the rate of change of the electrical parameter is essentially the same before and after the step change event. A set of N consecutive samples before the step change event are fit to a linear equation using least squares linear regression. Likewise, a set of N consecutive samples after the step change event are fit to a linear equation using least squares linear regression. The step change event occurs during the M samples between the before set of N samples and the after set of N samples. Typically N=5 and M=3, so a total of 13 samples are used. This represent approximately 0.2 seconds. If the slopes of the two linear equations are essentially equal, then the step change event value is the difference between the offset of the two linear equations. If the two slopes for the current are essentially equal, then the value of the corresponding step change event for the real power and the reactive power is also determined using corresponding samples.

When the negative step change event can be determined, the determined values for the current, real power and reactive power step change event are passed to step 1108. When the step change event can not be determined, processing proceeds to step 1114.

Step 1108 attempts to match the values of step change events to a device structure. Matches made using this process are less accurate and are therefore assigned a smaller confidence value for the Association confidence parameter of substructure 301 of the instance structure. Smaller match errors for more parameters increases the value of the Association confidence. However, instance structures associated through this process are not consolidated into the associated device structure.

In step 1108, only active instance structures with preliminary device structure association are considered. For each such instance structure, the v values from IE1(t, v, msd), PE1(t, v, msd), and RE1(t, v, msd)) of its associated device structure are compared to the corresponding step change values. A total match error for the three parameters is computed using the equations described for steps 910, 920, 930, and 940 in FIG. 9. If the match error is less than a predetermined match threshold, the step change event is a potential match to the instance structure.

The section 401 of the device structure includes four lists of up to N values each that characterize the relative timing and duration of associated instance structures with high Association confidence. If these lists contain N samples, then the potential match is further tested by determining the following parameters for the instance structure:
1. The shortest time between the start of this instance structure and any other complete instance structure associated with the same device structure.
2. The longest time between the start of this instance structure and any other complete instance structure associated with the same device structure
3. The duration of this instance structure These parameters are compared to values in the lists of corresponding parameters in the 401 section of the associated device structure (Shortest times between cycles, Longest times between cycles, Shortest cycle durations, and Longest cycle durations). The match is rejected if the parameters for the potential match instance structure are inconsistent with the values in these lists. This test will reject matches only when the device structure is characterized by at least N instance structures with high Association confidence.

After all of the associated instance structures are tested, further processing is done if there is more than one potential match. The middle section of each such instance structure is extracted to the extent possible. This process is the same as step 1110 described below. A second match error is determined for accurate extracted data compared to the corresponding data from the associated device structure. This match error is combined with the match error from the step change event to produce a final match error. Finally, the step change event is assigned to the instance structure with the smallest combined match error. The Association confidence value is determined by the final match error such that a smaller match error produces a larger value.

After a negative step change event is associated with an active instance structure, the instance structure is completed and made inactive. The On-off state of the instance structure set to off. Other structures associated with or linked to this instance structure are also updated to represent the change in the On-off state. Step 1110 extracts information for the middle section from the data set. Information can be accurately extracted only when the stable base value for the instance structure can be accurately determined. The stable base value for an instance structure can be accurately determined when the affects from other overlapping on-off cycles can be eliminated. For the portions of the middle section where the stable base value is accurately determined, middle section data pairs IM1(t, v), IM2(t, v), PM1(t, v), PM2 (t, v) . . . , and RM1(t, v), RM2(t, v) . . . , are determined. No data pairs are generated for sections where the stable base value is not accurately determined.

At least two data pairs can be determined by this process. The v value of the first data pair corresponds to the value that caused the start section to end. The v value of the last data pair corresponds to the value just before the negative step change event that begins the end section. Two data pairs are sufficient to determine the −M-minimum-v, −M-average-v, and −M-maximum-v values. If additional data pairs are extracted, they are also used in the determination of these values. If only two data pairs are extracted, they are deleted and the −M-period parameter is set to zero.

Periodic variations during the middle section that produce a positive and a negative step change event each period are extracted as instance structures and associated with a separate device structure. Additional processing will then associate the two device structures using a composite structure 500.

If many middle section data pairs are extracted and there are no step change events, they may represent a periodic variation. Periodic variation during the middle section with relatively small changes in their rate of change will not generate step change events. These are detected by processing the parameter values samples during the periods when the stable base value is accurately determined. Local minimum and maximum values are detected and saved as two lists of data pairs MAX1(t, v), MAX2(t, v), . . . and MIN1(t, v), MIN2(t, v), . . . . There is one minimum between each pair of maximums, and one maximum between each pair of minimums. For each list, the average t and the msd (mean square deviation) are calculated. If the number of data pairs is greater than a predetermined value and the msd less than a predetermined value, then the variations are determined to be periodic. The value of −M-period is the average of the two average t values. If the variations are not periodic, then the middle data pairs are stored without further processing.

If the variations are determined to be periodic, then samples values representing several complete periodic cycles are averaged to produce the sample values of one typical cycle. The maximum values of the cycles are aligned. These averaged sample values are then processed to extract the middle section data pairs IM1(t, v), IM2(t, v), . . . , PM1(t, v), PM2(t, v) . . . , and RM1(t, v), RM2(t, v) . . . .

It is possible the periodic variations are due to another device that is also on. All other instance structure in the on state are tested for potential contributions of periodic variations. If the instance structure has a preliminary association to a device structure, the associated device structure is also tested for periodic variations.

If the extracted periodic variation can not be attributed to any other instance structure, then the averaged sample data pairs representing one cycle replace the corresponding data pairs that were first extracted. The periodic variations for current, real power and reactive power are determined separately.

Two different processes are used to subtract the periodic variations in steps 1003 and 1013 of FIG. 10. For the portions of the on off cycle where its periodic variations can be accurately determined, the data set values are set to the stable base value for the on off cycle. For the portions of the on off cycle where the periodic variations and stable base values cannot be accurately determined, information from the associated device structure is used. The periodic variations represented by the middle section data triplets are used to produce a value for each sample of a complete periodic cycle. A match error value is calculated for this complete periodic cycle and a portion of the data set values where the periodic variations can not be determined. Successive match errors are calculated by shifting the complete periodic cycle by one sample period. The match error value will have minimum value when the periodic cycle has best alignment with the data set values. Using the alignment with the smallest match error, each sample of the periodic cycle is subtracted from the corresponding data set value. The periodic cycle is shifted by the number of samples corresponding to one period of the periodic cycle, and the match error calculated for alignments a few samples before and after this sample. The periodic cycle is again positioned with the alignment producing the smallest match error, and each sample of the periodic cycle is subtracted from the corresponding data set value. This process is repeated until the periodic variation is subtracted for all portions of the on off cycle where the periodic variations can not be determined.

After extracting the middle section of the instance cycle, step 1111 extracts the end section and completes the instance structure. Data pairs representing the end section are extracted from the data set. Since the end section typically spans only a few samples, a sloped stable base value is used to determine the values of the data pairs. The slope before and after the negative step change event is determined using linear least squares regression, and the average of these slopes is used as the slope of the stable base value. Typically the end section contains 3 data pairs. Device with large reactive loads can produce extended and non-linear end data samples, especially for reactive power.

Step 1111 also determines values for parameters in substructure 301 of the instance structure. These include the Turn off time, Measurement confidence, Association confidence, Voltage before turn-off, Voltage after turn-off, State A, and On-off state. The State A parameter indicates that the instance structure is no longer active and is complete.

Step 1114 updates the step change event (SEC) counts for all active instances structures. These values are considered when setting the value of Measurement confidence.

Step 1120 tests if an instance structure is capturing the data set variations. No more than one instance structure per service leg is capturing variations at any time. The value of the State A parameter indicates the instance structure is capturing variations. If there is an instance capturing variations, step 1121 updates the parameter values in the appropriate data substructures 310, 320, and 330. If there is no instance structure capturing variations, then the next step is 1101.

Devices with pulse type on off cycles can complete while step 1121 is capturing data for the start section or the middle section. The end of the on off cycle is indicated by the three v values becoming stable with essentially zero values. There is no negative step change event associated with these on off cycles. When this occurs during the start section, the values of −M-minimum, −M-average and −M-maximum are determined using the start section data pairs (−M-minimum=0). The values of −M-duration and −M-period, and −E1(t, v) are set to zero. When this occurs during the middle section, the middle section parameters are determined as usual and the −E1(t, v) are set to zero. The State A parameter is set to indicate a complete instance structure and the On off state is set to off. The other active instance structures are searched to determine the one with the most recent Turn on time value, and its State A value set to indicate that it is capturing data variations.

Step 1122 tests if the start section ended with this sample. For those instance structures still active after the start section, step 1123 attempts to make a preliminary association with a device structure based only on the determined parameters in the substructures 301, 311, 321, and 331. This preliminary association is used in step 1108 when matching a negative step change event to an active instance structure. This preliminary association is also used to determine the near real time operating status of devices for reports to the consumer.

Step 1123 is the final step in processing the current data set sample. The next step is 1101 which begins the processing of the next sample.

FIG. 12 is a flow diagram of the process used to attempt the decomposition of an unassociated instance structure into two separate instance structures, each associated with a device structure. The process of FIG. 12 is represented as step 1010 and step 1011 in FIG. 10. The process begins at 1201.

The decomposition process requires that one or more step change events occurred during the start section of the instance structure. Step 1202 uses the Start SCE count to control the processing. If the Start SCE count equals zero, the process exits at 1231. This exit means the instance structure was not decomposed into new instance structures associated with device structures.

While the Start SCE count is greater than zero, step 1203 scans the start section data pairs IS1(t, v), IS2(t, v), . . . for the next step change event. The step change events are processed sequentially until the instance structure is successfully decomposed or until all of the step change events in the start section are processed.

When a step change event is detected by step 1203, step 1204 determines if the step change event is positive or negative. A negative step change event indicates the end of some other instance structure. Step 1205 creates a new instance structure by copying the old instance structure and removing the effects of the negative step change event from the new instance structure. The magnitude of the step change event is determined using the method described for step 1107 of FIG. 11 and described in the foregoing. The magnitude of the step change is added to all of the affected parameters in all sections following the step change event. This correction is based on the assumption that this negative step change event affected the stable base value which was otherwise accurately determined for the period following the step change event.

The process represented by step 1206 is the same as the process represented by box 810 of FIG. 8 and described in the foregoing. Step 1207 compares the smallest match error to the predetermined match threshold. If the match error is less than the match threshold, then step 1210 associates the new instance structure with the corresponding device structure. The Measurement confidence and Association confidence values are set to low values since this association is base on assumptions that may not apply to this instance structure. Step 1210 also deletes the old instance structure. The processing is complete and exits at 1230.

No attempt is made to identify the instance structure that produced the negative step change since the process of FIG. 11 previously processed the same step change event and failed to associate it with an instance structure.

If the match error in step 1207 is not less than the match threshold, then step 1209 decrements the Start SCE count, deletes the new instance structure. The next step is 1202.

If the step change event tested in step 1204 is positive, then step 1220 attempts to match the instance structure to a device structure using only the data pairs occurring before the step change event. The process to find the closest match is nearly the same as represented by box 810 of FIG. 8. The difference is that only a portion of the tests shown in FIG. 9 are made. Only step 903 is used to reject a match. Only the new data pairs in start sections that occur before the step change event are used to calculate the match error. Since the match error is normalized by the number of weighted error values in the sum, the same predetermined match error threshold can be used when testing for a match.

Step 1221 compares the match error to the predetermined match threshold and if not less, step 1228 decrements the Start SCE count. The next step is 1202 and the processing continues if there is another step change event.

If the match error is less than the match threshold, then step 1222 creates a new instance structure A by copying the old instance structure. Information from the device structure associated with the smallest match error is used to determine the data pairs that follow the step change event and to determine all other parameters affected by information that occurs after the step change event. Instance structure A is an extrapolation of the complete on-off cycle behavior based on the characteristic behavior contained in the device structure that was selected as the best available match based on the portion of the start section that occurred before the step change event.

Step 1223 creates a second new instance structure B by copying the old instance structure. Its parameters are modified by subtracting the contributions of the new instance structure A from the B instance structure. Step 1224 uses new instance structure B and finds the device structure with the smallest match error. Step 1224 represents the same process as box 810 of FIG. 8.

Step 1225 compares the smallest match error to the predetermined match threshold. If the match error is less than the match threshold, then step 1227 completes determining the parameters of the new instance structures A and B including device association, and then deletes the old instance structure. This completes the decomposition process which ends at 1230.

If the match error is not less than the match threshold, then step 1226 deletes the new instances structures A and B. Then step 1228 decrements the Start SCE count and processing continues with step 1202.

In the foregoing, the process of subtracting the contribution of one instance structure from another is done sample by sample for those portions of the on off cycles that are rapidly changing. Linear interpolation between the data pairs is used to create real power, reactive power, and current values for each sample of these rapidly changing portions. The corresponding sample values are subtracted. Then new data pairs for the instance structure subsections 310, 320, and 330 are determined using the modified samples.

Figure 13:
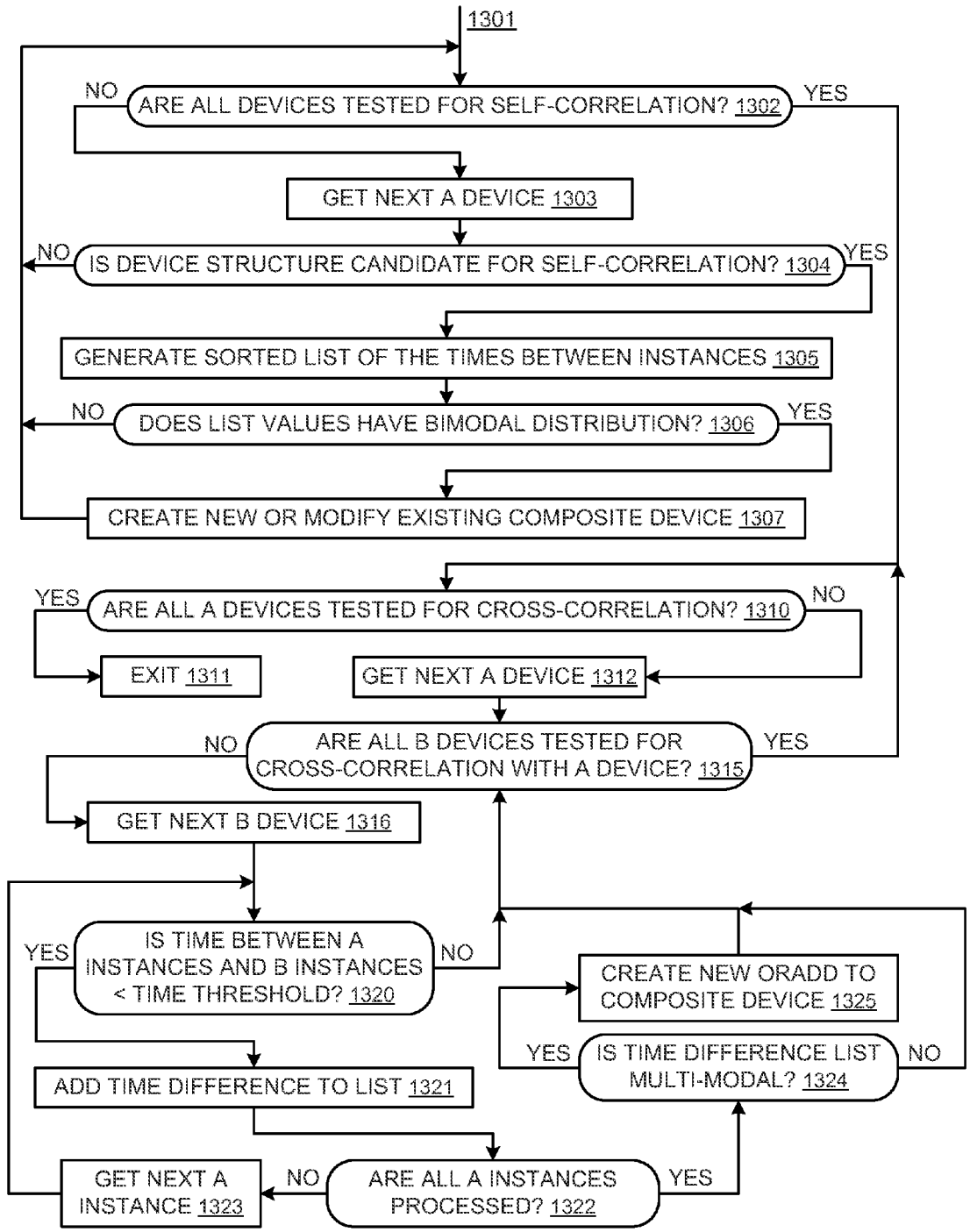
FIG. 13 is a flow diagram of the process used to recognize composite electrical devices based the time correlation of instance structures, and to create composite structures that represent the composite devices.

FIG. 13 is a flow diagram of the process used to time correlate instance structures 300 associated with device structures 400 to characterize composite structures 500. Instance structures may be self-correlated or cross-correlated.

Self-correlated means that all of the on-off cycles of one device occur in an identifiable and repeatable pattern. For example, all of the on-off cycles of the thermostatically controlled heating element in a coffeemaker occur within a few minutes of another on-off cycle. When the coffeemaker is started, the first on-off cycle ends a few minutes before the start of the second on-off cycle. The last on-off cycle begins a few minutes after the end of the next to last cycle. The device structure 400 characterizes the on-off cycles of the heating element, but does not characterize this higher level of behavior of a coffeemaker. The composite structure 500 characterizes this higher level behavior so that many cycles of the heating element are recognized as a single on-off cycle of a coffeemaker.

A device and B device are cross-correlated if each instance structure associated with the A device has one or more instance structures associated with the B device that occur with a repeatable and identifiable pattern. As an example, all instance structures of the Leg A heating element and the Leg B heating element of a 240 volt electric oven occur at nearly identical times and have nearly identical durations. These heating elements are separately identified device structures that are components within a single electrical device. It is more useful to identify and track the electric oven as a single device and to combine multiple heating element on-off cycles into a single on-off cycle.

As another example, a typical 240 volt electric clothes dryer has two heating elements and a motor. In this case the on-off cycles of the heating elements always occur during an on-off cycle of the motor. The on-off cycles of the two heating elements and the motor are characterized by separate device structures 400, and the composite structure 500 characterizes this higher level behavior. A single on-off cycle of the composite device represents many on-off cycles of its heating elements.

It is possible that the A device is cross-correlated with the B device, but the B device is not cross-correlated to the A device. For example, the heating elements of many 120 volt kitchen appliances such as a coffeemaker use approximately the same power as each heating element in a 240 volt oven. Since most heating elements have very similar behavior, the Leg A heating element of the oven and the heating element of the coffeemaker served by Leg A could be associated with the same device structure. In this case when the oven is used, there is an instance structure associated with the Leg A heating device structure that occurs at essentially the same time as every instance structure associated with the Leg B heating device structure. The A device is cross-correlated to the B device since every on off cycle of the B device is accompanied by an on off cycle of the A device. However when the coffee maker is used, there are many instance structures associated with the Leg A heating device structure that are not accompanied by an instance structure associated with the Leg B heating device structure. Therefore the B device is not cross-correlated to the A device.

Step 1301 in FIG. 13 is the start of the correlations process. The correlation process is typically done after step 1016 of FIG. 10. Steps 1302 through 1307 search for self-correlated instance structures associated with a device structure. Step 1302 and 1303 control the processing of all device structures.

Step 1304 is a quick test that determines if the device structure may represent a self correlated device. The first quick test compares the Number of instances parameter value in the substructure 401 of FIG. 4 to a predetermined value that ensures there are sufficient instance structures to reliably determine self-correlation. This predetermined value is typically between 100 and 500, depending on the size of the data set.

The quick test then makes two comparisons of values from the list of Shortest times between cycles (t1, t2, . . . , tN) and a value from the list of Longest times between cycles (t1, t2, . . . , tN) in the substructure 401. The comparisons are:

3*Shortest times . . . (t1)>Shortest times . . . (tN)

10*Shortest times . . . (tN)<Longest times . . . (t5)

The first comparison ensures there are sufficient instance structures that occur near each other. The comparison ensures that at least five complete on-off cycles of the candidate composite device occurred. If either of these statements is false, then the device structure is not a candidate for self-correlation, and next step is 1302.

Step 1305 generates a sorted list of the times between sequential instance structures associated with the candidate device structure. Step 1306 then tests the list for a bimodal distribution. Bimodal distribution has a relatively large time difference separating two groups of times. The first group consists of relatively short times that have relatively small differences between adjacent times. This group represent the short frequent cycles that occur while the composite device is on. The second group is separated from the first group by a time difference that is predetermined number times longer than the longest time in the first group. This group represents the times between complete on-off cycles of the composite device.

If the list of times does not have a bimodal distribution, then the next step is 1302. If the list of times has a bimodal distribution, then step 1307 either creates a new composite structure or modifies an existing composite structure. The Composite device parameter in substructure 401 is set to zero when there is no existing associated composite structure. This occurs when the data set is processed for the first time. If there is an existing composite structure, then the Composite device parameter references the corresponding composite structure and the values of its parameters are updated. This occurs when the data set has been previously processed. The data set is reprocessed periodically as new data is added to the data set.

Step 1307 reprocesses all of the associated instance structures in order of occurrence to extract values for the relevant parameters in subsections 501 and 510 of the composite structure 500. The meanings of these parameters are specified in the foregoing description of FIG. 5.

After all device structures are processed for self-correlation, steps 1310 through 1325 process the associated instance structures and associated device structures and composite structures for cross-correlation. This processing tests each pair of device structures for cross-correlation, so the processing time increases as the square of the number of device structures. The A device cross-correlation to the B device and the B device cross-correlation to A device are separately processed. The processing has two loops that each step through all device structures and composite structures. The outer loop steps through all A devices and the inner loop steps through all B devices. The A devices and B devices represent the same total set of device structures and composite structures. They are separately named only to facilitate the description and understanding of the processing steps.

Step 1310 test if all A devices (all device structures 400 and all composite structures 500) have been tested. The process exits at step 1311 after all devices have been tested. If there is another A device, then step 1312 gets the next A device for processing.

Step 1315 test if all B devices have been tested for cross-correlation. Processing is not done if the A device and the B device are the same device. If all B devices have been processed, then the next step is 1310. If there is another B device to test for cross-correlation with the A device, then step 1316 gets the next B device.

Step 1320 sequentially accesses each instance structure associated with the A device and searches the instance structures associated with the B device that occurs within a predetermined time threshold. The time threshold determines the practical time window that can detect most typical residential composite devices such as clothes washers and dryers and dish washers. The time threshold is typically one to three hours. If the B device is not associated with a composite structure, then all instance structures associated with the B device within the time threshold are processed. If the B device is associated with a composite device, then only the B device instance structure nearest in time to the A device instance structure is processed.

Step 1321 determines the times between the instance structure associated with the A device and all qualified instance structures associated with the B device. These time differences are appended to a list of time differences.

If there are no instance structures associated with the B device that occur within the time threshold, then the B device is not cross-correlated with the A device. The test requires that every instance structure of the A device is associated in time with at least one instance structure associated with the B device. If the test fails for any instance structure associated with the A device, then the next step is 1315.

Step 1322 tests if all instance structures associated with the A device structure are processed. If there is another instance structure to processes, step 1323 gets the instance structure for processing in step 1320.

After all instance structures associated with the A device structure are processed, there must be at least one time in the list for each associated instance structure. Step 1324 tests if the list of times is multi-modal. The list is multi-modal if there are one or more groups of time values that are similar to each other. Each time in a group must be within a predetermined percentage of every other time in the group. The predetermined percentage is typically between 5% and 20%. If there is more than one group, then the difference between the averages of the times in the groups must be larger than the maximum difference between any two times within each group.

If the list of times is not multi-modal, then step 1315 test is there is another B device for processing. If the time difference list is multi-modal, then step 1325 creates a new composite device structure or modifies an existing composite device structure. If the A device is not associated with a composite device, then the Composite device parameter in substructure 401 is set to zero. For this case, a new composite device is created and the Composite device parameter is set to reference this new composite device structure. Step 1325 reprocesses all of the associated instance cycles in order of occurrence to extract values for the relevant parameters in subsections 501 and 510 and 510*b* of the composite device structure 500. The parameters of subsection 510 are determined by the instance structures associated with the A device. The parameters of subsection 510*b* are determined by the instances structures associated with the B device structure that are also cross-correlated to the instance structures associated with the A device structure. The meanings of these parameters are specified in the foregoing description of FIG. 5.

The Device link parameter is substructure 510*b* is set to reference the B device structure. However, the Composite device parameter in section 401 of the B device structure is not set to reference the new composite device structure. Only the device structure that created the composite device structure and determined the substructure 510 is linked to the composite device. However, the composite device can link to an unlimited number of device structures.

If the A device is associated with an existing composite device structure, then there is a substructure 510 associated with the A device. The parameters in substructure 501 and substructure 510 are updated using information from the instance structures associated with the A device structure. The B device structure may already be associated with the composite device substructure 510*x*. If so, then the instance structures that are associated with the B device and that are also cross-correlated with the A device are used to modify the parameter values of substructure 510*x*. If the B device structure is not associated with an existing substructure 510*x*, then a new substructure 510*x* is added to the composite device structure. Its parameter values are determined by the instance structures that are associated with the B device and that are also cross-correlated with the A device After the composite device structure is created or modified, the step 1315 is next. After all A device structures are tested for cross-correlation, the process exits at 1311.

When a device structure is created, it useful to provide information that helps the consumer identify the corresponding specific device in the home. Useful information is provided by a predetermined library of generic device structures that characterize devices of a known type. Some examples of generic devices are:
  Incandescent light (I-Light)
  Slow start florescent light (SSF-Light)
  Fast start florescent light (FSS-Light)
  Instant start florescent light (ISF-Light)
  120V heater (120V Heater)
  220V heater (240V Heater)
  Refrigerator
  Hard start motor (garage door opener, garbage disposer)
  Induction motor (bathroom fan, HVAC fan, pool filter)
  Universal motor (vacuum, power tools, kitchen appliances)
  Air Conditioner Including the power usage provides additional information useful for identification. Some examples names:
  40 W I-Light
  100 W I-Light
  240 W I-Light (four 60-watt bulbs)
  320 W SSF-Light (eight 40-watt florescent tubes)

Each newly created device structure is compared to each generic structure in the library. The generic device with the smallest match error provides the generic description of device. For convenience, device structure 400 is also used as the generic structure. For a generic structure 400, the Generic type parameter in substructure 401 is determined by direct observation and set and fixed when the library is created. When a match is found, this generic description is appended to the average power use rate (PM-average-v) of the new device to determine the Generic type parameter of the device substructure 401.

The match error between a device structure and a generic structure is determined using a process adapted from that of FIG. 9 and described in the foregoing. All parameter values are normalized before determining the match error so that a single generic structure will match many different device structures. For example, incandescent lights from 20-watt to 300-watt have on-off cycles that are similarly shaped and have similar properties. For example, the device structure for a 60-watt incandescent light can be used as the generic structure for all incandescent lights.

Parameter normalization is accomplished by dividing each v value of all data triplets for current by IM-average-v and by dividing each v value of all data triplets for real power by PM-average-v. Since the RM-average-v can be zero or negative, the reactive power v values are divided by the corresponding real power v values (equivalent to the power factor). Therefore the weighted match errors are calculated using the computed power factors.

The library of generic instances may have several generic instances that have the same value for the Generic type parameter. For example, most refrigerators have a start section that is generally similar to that shown in FIG. 6. However there is significant variation in the durations of the two relatively flat sections and the relative values during the second flat section. These differences are important since many homes have more than one refrigerator-like device, so the refrigerators can often be separately identified and tracked. However, they are all identified as refrigerators. Likewise, different florescent lights may have very different behaviors. In addition, the behavior of a specific florescent light typically depends on the time between its on-off cycles.

The result of the processes described in the forgoing is a set of on-off cycle instance structures 300 associated with device structures 400 which can in turn be associated with composite structures 500. These sets of structures are used with the report structure 1400 shown in FIG. 14A to generate reports that provide useful information to the consumer. The report structures provide an interface between the structures extracted from the data set and the processes that generate reports useful to the consumer.

These reports may represent a period of time in the past. For example the consumer can set the time period to the period covered by a recent utility bill. The reports then provide information about the contributions of various devices and combinations of devices to that bill. As another example, the consumer can set a convenient start time (such as the beginning of the current billing period) so the reports provide near real time information about power used and cost to operate from the beginning of the billing period to the present time. The reports can also provide the near real time indication of the operating status, power usage, and cost of operation for multiple devices.

There is a report structure for each composite structure 500 and for each device structure 400 that is not associated with a composite structure. Additional report structures are used to consolidate the information from a set of other report structures. For example, all report structures with Generic type "I-Light" are consolidated and reported as a single report structure called "Incandescent Lights". There is a report structure for each generic type in the predetermined library. As another example, the consumer can use the interactive display described in the following to group all kitchen appliances and kitchen lights into a report structure called "Kitchen".

The report structure 1400 in FIG. 14A contains the following parameters:

1. Consumer name—the name used in reports to identify the device. It is initially set automatically when the report structure is created, and includes the Generic name from the device structure and the average power. The consumer can change the Consumer name using the interactive display described in the following.
2. Components (D1, D2, . . . )—variable length list of the N device structures 400, and or composite structures 500 that are represented by the report structure. The Components list is created automatically for some report structures. The consumer can create or modify the Components list using the interactive display described in the following.
3. On-off state—the near real time operating status of the device (or devices) represented by the report structure. The On-off state of the instance structures associated with the device structures is set to the on state by step 1123 in FIG. 11. The On-off state of the instance structure is set to the off state by step 1111 in FIG. 11. The instance structures On-off states determine the device structures On-off states and the composite structures On-off states. If any associated On-off state is set to on, then the On-off state of the report structure is set to on.
4. Device count—the number of devices represented by the report structure that have their On-off state set to on. The Device count value can be greater than one if there is more than one device structure or composite device structure represented by the report structure, and/or if there are two or more devices in the home that are associated with the same device structure. For example, many homes have multiple 60-watt lights. Therefore, there could be multiple 60-watt lights on at the same time. The Device count does not include the On-off states of the device structures associated with a composite structure.
5. Number of cycles—the total of all the complete on-off cycles of all the devices represented by the report structure. This parameter is used in some reports as an indication of device activity. The Number of cycles does not include the on-off cycles of the device structures associated with composite structures.
6. Run time—the cumulative total time that the devices represent by the report structure have operated. The value includes the multiplier effect of the Device count parameter. For example, if the Device count value is two, then the Run time value increases at twice the rate of real time. If the report structure has one or more components that are also report structures, then the Run time from each component report structure is added to the Run time of the report structure.
7. Power use rate—the near real time power used by all the devices represent by the report structure. It is determined by summing the PM-average-v value (in substructure 422) of all devices in the Component list that are operating. The value includes the effects of the Device count parameter. For example, if the Device count value is two, then the Power use rate value is multiplied by two. If the report structure has one or more components that are also report structures, then the Power use rate from each component report structure is added to the Power use rate of the report structure.
8. Total power used—the total of the Power use rate times the update period for the series of update periods that represent the report period. The Power use rate parameter is in units of watts. The Total power used parameter is in units of watt-hours. When updating near real time reports, the update period is typically a few seconds. When preparing a historical report, the Total power parameter is updated when there is a change in the Power use rate.
9. Device power—the average power used by the devices represented by the report structure when these devices are operating. It is determined by dividing the Total power used by the Total run time.
10. Power cost rate—the near real time cost to operate the devices represented by the report structure. It is determined by multiplying the Power use rate parameter by the real time value of the cost of power provided by the electrical service.
11. Total power cost—the total of the Power cost rate times the update period for the series of update periods that represent the report period. When updating near real time reports, the update period is typically a few seconds. When preparing a historical report, the Total power cost parameter is updated when there is a change in the Power cost rate for the devices represent by the report structure.

The cost of power may be fixed for long periods of time, or it can vary in complex ways. It is expected that in the future, the costs will generally be more variable depending on real time availability and demand. FIG. 14B illustrates the power cost data structure 1450 used to represent the cost of power. The cost structure is a two dimension array with variable size dimensions. The dimension sizes depend on the complexity of the variable cost. The first index of the array specifies the cost variations applicable at a specific time. The second index of the array specifies cost variations applicable at different times. The cost structure contains the following parameters:

1. Start Date parameters 1451: S-Date1, S-Date2, . . . —specifies the beginning dates when the cost variations are in effect.
2. Start Time parameters 1452: S-Time1, S-Time2, . . . —specifies the beginning time in the day when the cost variations become effective.
3. Cost-One parameters 1453: Cost-One1, Cost-One2, . . . —the cost rate ($/kWh) for the first amount of power used.
4. Tier-Two parameters 1454: Teir-Two1, Teir-Two2, . . . —the power use value that causes the cost rate to change.
5. Cost-Two parameters 1455: Cost-Two1, Cost-Two2, . . . —the cost rate ($/kWh) for the power used after the Tier-Two value is exceeded.
6. Additional tier and cost parameters as needed.

During a period of time, the cost may vary depending on other conditions. For example, the cost may increase after a predetermined amount of total power has been used since the start of the billing period. This is sometimes called a total use surcharge. For this case, the Cost-One parameter is the cost rate ($/kWh) for the first amount of power, Tier-Two is the predetermined amount of power, and Cost-Two is the cost rate for the power that exceeds Tier-Two power. Additional parameters are used if there are more cost tiers.

As a second example, the cost may increase when the rate of power consumption exceeds a predetermined peak value.

This is sometimes called a peak use surcharge. For this example, Tier-Two is the predetermined peak value and Cost-Two is the cost for the power use that exceeds the predetermined peak value. The cost structure can easily be modified by those ordinarily skilled in the art of programming so that is can also represent a combination of these two examples as well as other cost structures that may be developed by utilities.

The information extracted from the data set using the processes described the foregoing can be presented to the consumer in wide variety of ways. FIG. 15 is one example of a display produced on display 124. This display provides useful information to a consumer and the consumer can interact with the display to access other information. Those ordinarily skilled in the art of programming can easily utilize the extracted information to produce many other kinds of displays useful to consumers and others. This example should not be construed in any way to be a limitation of this invention.

The FIG. 15 display is updated when the On-off state of an instance structure associated with a device structure changes. It is also updated periodically to provide near real time values of power, cost rate, total time of operation, and total operating cost for the devices represented by device structures and composite structures. Totals are calculated for the period between the START DATE and the START TIME and the END DATE and END TIME. When the data entry device 125 is a touch screen on display 124, the consumer sets these values by touching the area that displays the value. This causes a calendar display or a clock display to appear. The consumer then touches the desired values. One choice for END DATE is "PRESENT". This causes the END DATE and END TIME to always be to the present date and time. After a value is selected, the FIG. 15 display values are updated.

After the consumer makes a change to a date or time value, Processor 122 uses the structures and processes described in the foregoing for the period of time specified by the start and end dates and times. If the END DATE is set to PRESENT, the accumulated real power is updated and displayed periodically. The TOTAL POWER (KWH) area of the display shows the total power in kilowatts used during the specified time period. The TOTAL $ area of the display shows the cost of the power used during the specified period.

The cost values are based on the rates charged by the utility. These rates could be updated directly by the utility using a communications protocol specified by the utility. Alternately the consumer could enter the rates specified on their utility bill using the touch screen. For example, touching the RATES area could produce a specific display for entering the values for the cost structure 1450 of FIG. 14B and described in the foregoing.

The total power measured by the utility and used for billing will typically be different than the total power measured by this invention. In addition to uncertainties in the start and end times of the billing period, typical variations in calibrations and nonlinearities can cause differences exceeding 10%. The reported value of TOTAL POWER (KWH) can be adjusted using a calibration factor CF such that:

TOTAL POWER (KWH)=CF*measured total power

CF is computed by setting the START DATE and END DATE to match the billing period. The time of day when the meter is read is typically unknown, so the START TIME and END TIME are both set to the same arbitrary time. Then:

CF=utility bill power/measured total power

As an example, the consumer uses dates on the utility bill to set the START DATE and END DATE. Then touching the TOTAL POWER (KWH) produces a specific display for entering the total power from the utility bill. Processor 122 can then calculate CF and use it to scale the measured total power so the displayed value of TOTAL POWER (KWH) is approximately the same as the utility bill total power.

The PRESENT RATE (W) area of the display shows the real power presently being used. The $/HR area displays the cost per hour at the present power and price rate.

Touching the IDENTIFY area enables the consumer to identify a specific device structure, a composite structure, or initiate the creation of a new device structure. When IDENTIFY is touched, Processor 122 generates a display that instructs the consumer to turn on and turn off the specific device the consumer wants to identify. The consumer then turns the device on and off multiple times. Processor 122 extracts instance structures and attempts to match the instance structures to an existing device structure. If the instance structures match a device structure, Processor 122 creates a display that enables the consumer to enter a new name for the identified device structure. The display shown in FIG. 16 can be used for this purpose. If the instance structures can not be matched to an existing device structure, then a new device structure is created. The consumer can then enter a name for this new device structure.

Touching the GROUP area enables the consumer to create a new report structure composed of multiple device structures, composite structures, or report structures. This makes it easier to track the power used for specific purposes or activities or by specific consumers in the household. Processor 122 creates a display that enables the consumer to select from the available structures. After the selection is complete, the consumer provides a name for the report structure. Thereafter, the operating information of these devices is combined and displayed as a single device. In all displays, the name of a report structure representing multiple device structures and composite structures is visually distinguished from the name of a report structure representing a single device structure or composite structure. This may be done by using different fonts and/or different colors for the names. For example, in FIG. 15, the FAMILY RM LIGHTS is a report structure created by the consumer that includes multiple separately switched light fixtures. It is displayed using bold fonts to distinguish it from the other reports.

The next display area shows information represented by the report structures. The headings describe the information available for each report structure. One way to make the display more useful is to enable the consumer to select how the report structures are sorted for display. For example, touching the DEVICE area of the headings causes the report structures to be sorted alphabetically by name. Touching any area a second time reverses the sort order. Touching any heading parameter causes the sort order to be determined by that parameter.

DEVICE is the name given to the report structure. Initially, these names are determined by the processes described in foregoing using the power and the Generic type parameter. The names 1469 W HEATER and 225 W FAN MOTOR are determined by the processes. Some devices such as an air conditioner, refrigerator, or washing machine can be specifically identified using the power and usage patterns. The consumer can identify a device and provide a name as described in the forgoing. An alternate method is described in the following.

There may be multiple electrical devices in the residence that behave nearly identically, and are therefore characterized by a single device structure. The Device count parameter in the report structure 1400 represents the number of devices presently on. When the Device count parameter is greater than two, its value is displayed in parentheses suffixed to the device name. For example, 60 W I-LIGHT (2) as shown in FIG. 15 indicates two incandescent lights, each using 60 watts, are on.

Touching the ON/OFF area causes all of the report structures that are on to be moved to the top of the display. Within the separate groups of report structures in the on state and report structures in the off state, the previous sort order is preserved. The area for the information about a report structure in the on state is differentiated from the area for a report structure in the off state. In FIG. 15, report structures in the on state are underlined. With a color display, report structures in the on state might be displayed on a red background and report structures in the off state might be displayed on a green background.

For a report structure in the on state, POWER (W) is the value of the Power use rate parameter in the report structure 1400. It represents the near real time value as determined by the near real time process of FIG. 11 that extracts the instance structures. This value is typically different than the Device power parameter in report structure 1400 that is displayed when the report structure is in the off state.

For a report structure in the on state, the value of the Power cost parameter is displayed under the $/HR heading. This is the near real time cost of operating all devices in the on state represented by the report structure, including the effects from variable power prices. For a report structure in the off state, the average cost of operation is displayed. This is determined by dividing the Total power cost parameter by the Run Time parameter. This is the average hourly operating cost during the period between the start and stop dates and times.

TOTAL TIME is the accumulated time the device has been on during the period between the start and stop dates and times. The value of the Run time parameter is displayed.

TOTAL $ is the accumulated cost of operating the devices during the period between the start and stop dates and times. This includes all real time adjustments described in the foregoing. The value of the Total power cost parameter is displayed.

All real power that is not represented by instance structures associated with device structures is represented by the UNKNOWN report structure. In most homes there are devices that are on all of the time, or can not be characterized by the information in the data set. There are also cases where supply noise, device generated noise, or nearly simultaneous on-off cycles make it impossible extract an instance structure that can be associated with a device structure. There are also some devices that do not produce consistent transitions. For example, an incandescent light controlled by a dimmer switch has highly variable on-off cycles and uses power at variable rates.

The display for the UNKNOWN report structure always follows the headings. It is not affected by any of the sorts. The values displayed for UNKNOWN have slightly different interpretation than the values for the other report structures. The POWER (W) parameter is always the power that is not represented by any report structure. Typically there is always some power that is not represented. UNKNOWN is displayed as an on device unless the unidentified power is very nearly zero. The $/HR display is the near real time cost of the power not represented by other report structures.

The TOTAL TIME displayed for UNKNOWN is the elapsed time from the start date and present time, or the elapsed time between the start and end time and date. In FIG. 15, the TOTAL TIME for UNKNOWN is 15 days, 19 hours, 12 minutes, and 14 seconds. The TOTAL $ display is the total cost of the power not represent by other report structures during this time period.

All of the report structures are listed below the UNKNOW device. Typically the display is not large enough to show all report structures, so multiple pages are provided. Pressing GO TO NEXT PAGE produces a display with the heading GO TO PREVIOUS PAGE at the top and followed by a repeat of the header DEVICES ON/OFF . . . , etc. Below the header is the continuation of the sorted list of report structures. If additional displays are needed, then GO TO NEXT PAGE is displayed at the bottom.

Figure 16:
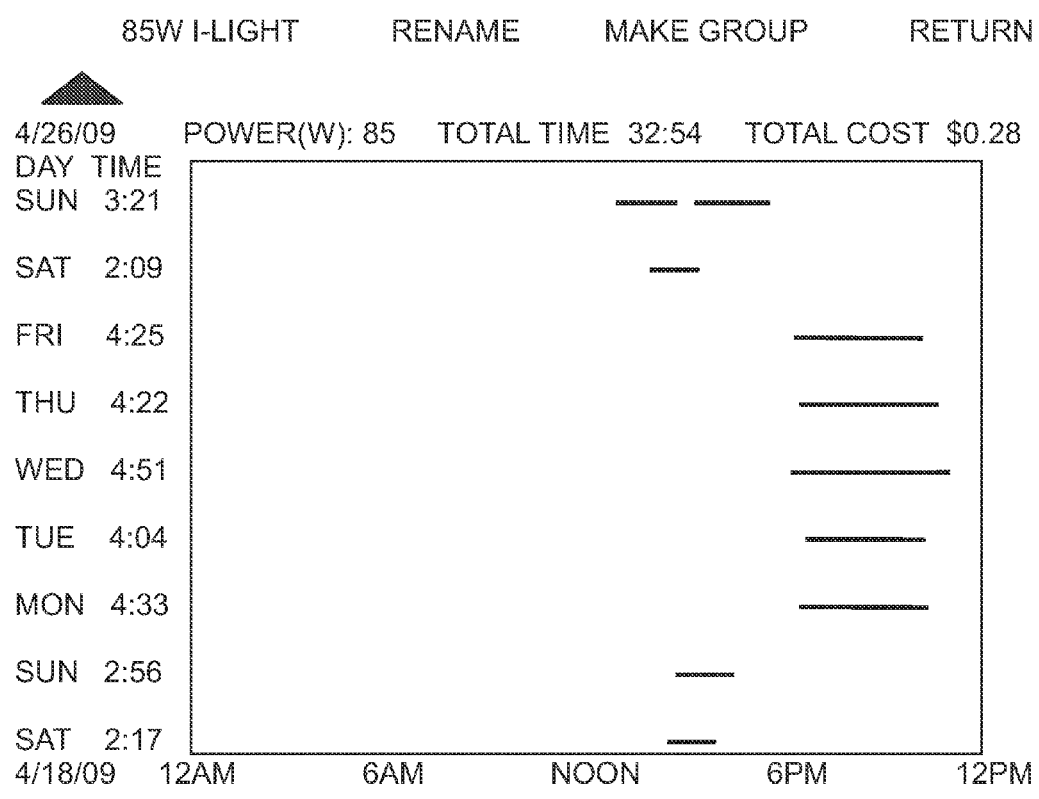
FIG. 16 is an example of a consumer display showing the usage an electrical device during a period of days.

Additional useful information can be displayed for each report structure. FIG. 16 is one example of such a display. Many other displays are possible and can be easily designed by those ordinarily skilled in the art of display graphics and human interface. This example should not be construed in any way to be a limitation of this invention.

FIG. 16 uses a calendar-like display to show the operation history of specific report structures. Processor 122 generates the display when the consumer touches an area associated with a specific report structure in the display shown in FIG. 15. For the FIG. 16 example, the report structure selected is 85 W I-LIGHT. The FIG. 16 example displays nine days of operation, beginning Apr. 18, 2009 and ending Apr. 26, 2009. The dates can be changed by touching the up-pointing arrow or the down-pointing arrow. In this example, the period is fixed to be nine days with operating details for each day.

Similar displays can be easily produced to show weekly or monthly patterns. For a weekly display, the bottom line might be the day of the week and the bars replaced by text representing the on-time for each day. Alternately, a bar graph could be displayed. The horizontal axis would show days, and the height of the bar would be proportional to the total on-time or cost for that day. A time period of several months could be displayed using such a graph.

In FIG. 16, the column on the left shows the day of week followed by the time (hours: minutes) that the report structure was in the on state for that day. The bottom line of the display shows the time of day. For each day, a horizontal bar corresponds to when the report structure was in the on state. The total length of the bar is proportional to the total time on for that day. Each on period during the day is shown as a separate bar. For example, Apr. 26, 2009 (SUN) shows two on periods during the afternoon.

POWER(W) is the average power used by the report structure (total power/total time) during the display period. TOTAL TIME is the total time the report structure was on during the display period. TOTAL COST is the cost of operating the report structure during the display period. This includes rate adjustments that were applied in near real time.

If the report structure represents multiple structures, then separate adjacent bars are shown for each structure represented by the report structure. The values of POWER(W), TOTAL TIME, and TOTAL cost are calculated as described in the foregoing.

Touching the RENAME area enables the consumer to enter a new name for the report structure. With a touch screen, a keyboard display is shown and the consumer touches the letters sequentially to spell the name.

Touching the MAKE GROUP area enables the consumer to make a new report structure that contains the displayed report structure. If the displayed report structure represents a group, then the MAKE GROUP area is replaced with EDIT GROUP. Touching this area enables the consumer to add or remove report structure.

Touching the RETURN area causes the display shown in FIG. 15 to be generated.

Figure 17:
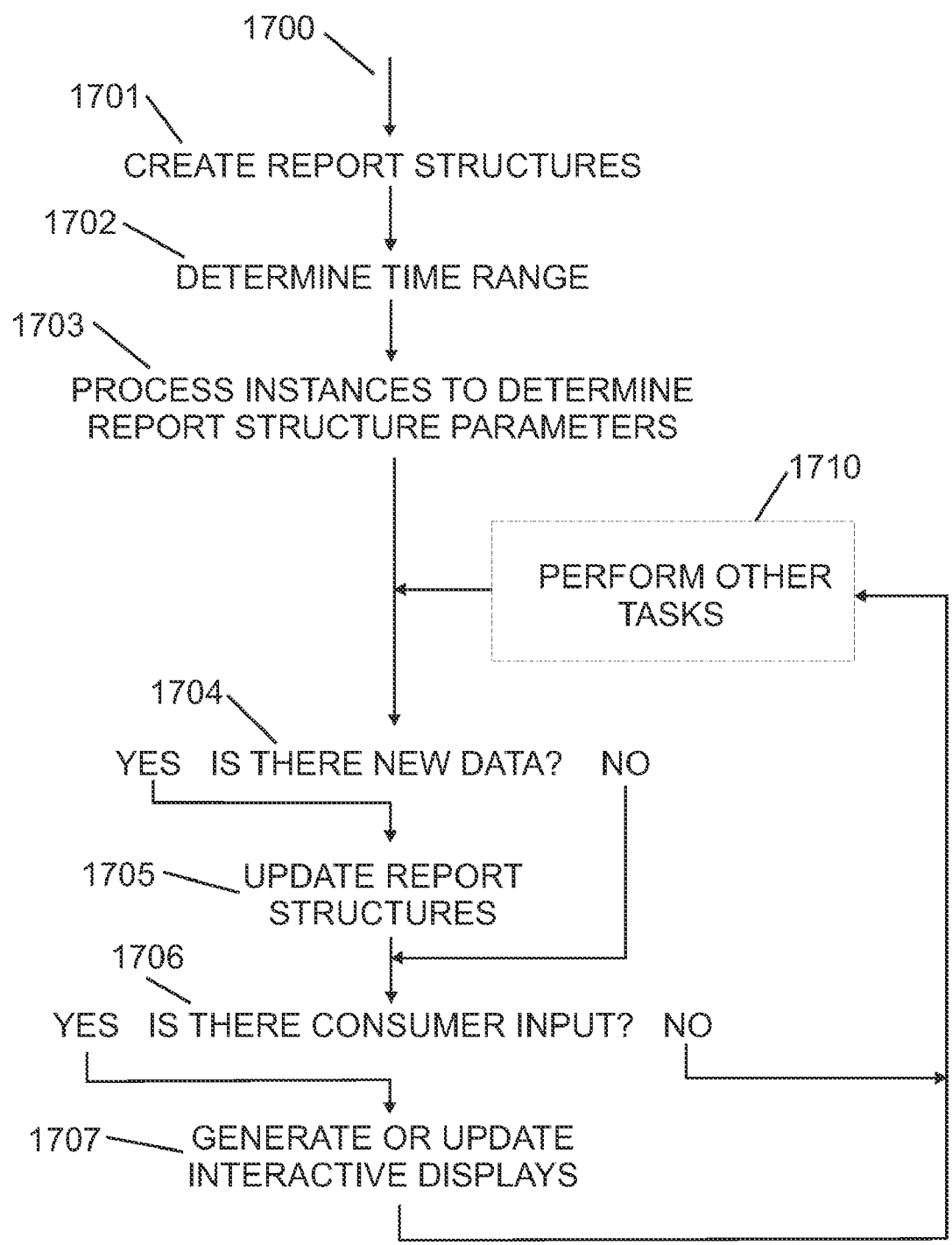
FIG. 17 is a flow diagram of the operations performed by Processor 122 to determine and update report structures and generate consumer displays.

FIG. 17 is a flow diagram of the process that creates the report structures and generates consumer displays. The process begins at 1700.

Step 1701 creates a report structure 1400 for each composite structure, each device structure that is not associated with a composite structure, and for each unique generic type in the generic library. This step is typically performed after the composite structures are created using the process of FIG. 13.

Step 1702 determines the time range to be represented by the report structures. The range is specified by a start time and an end time. The end time can be the present time so the report structures can represent information in near real time.

Step 1703 process the instance structures for an overlapping time range that is sufficient to determine the on-off state of every device structure and composite structure at the beginning of the time range determined in step 1702. This information is also used to initialize the Device count parameter in each report structure.

All instance cycles associated with a device structure that are within or overlap with the time range are processed. The information from an instance cycle may be used for two or more report structures. The Components (D1, D2, D3, ... ) parameters are used to link each instance structure through its associated device structure to the appropriate report structures. Each instance cycle is processed only once. As the instance structure information determines report structure parameter values, the determined values are applied to each of its linked report structures.

Real power values from the instance structure data pairs in the real power substructure 320 are used for the periods when they can be accurately determined. For periods when the instance data pairs are not accurately determined (due to uncertainty of the stable base value), values from the associated device structure data triplets in substructure 420 are used. These power values and their corresponding times are accumulated to determine the values of the report structure parameters Run time and Total power used. The power values are used with data from the cost structure 1450 to determine the cost of the power, which is accumulated to determine the value of the Total power cost parameter.

If the cost of power depends on the total power used during the billing period, then the total power used during the billing period is separately determined. It is determined by accumulating the real power values in the data set samples from the start of the billing cycle that overlaps the time range to the start of the time range. It is then kept current as each instance cycle is processed. The total power used does not depend on the values of any instance cycle, so all instance cycles associated with a device can be processed sequentially and independently.

If the cost of power depends on the peak power, then the real power value from the data set for the corresponding time is used with values from the cost structure to determine the cost.

As step 1703 processes the instance cycles, the report structure parameters On-off state, Device count, and Number of cycles are updated.

The values of the Power use rate, Device power, and Power cost rate parameters are determined when the end of the time range is reached. Each instance structure in the on state at the end of the time range is processed. The value of the real power at that time is determined and added to the Power use rate parameter of each report structure linked to that instance structure. After the Power use rate is determined for all report structures, the value of the Power cost rate parameter is determined by dividing the Total power used parameter by the Run time parameter. The value of the Device power parameter is determined by dividing the Total power used parameter by the Run time parameter.

Steps 1701 through 1703 determine the values of the report structure parameters for a specific time range. For near real time reports, the data set is processed incrementally as samples are received through the data link 131. Processing box 1710 represents other tasks that processor 122 performs between samples.

Step 1704 represents the test for new data. This can be done through an interrupt generated by data link 131 or the other task processes can periodically test the data link interface.

When there is new data, step 1705 incrementally updates the report structures. This is done after instance structures are incrementally updated by the process described in the foregoing.

Step 1706 represents the test for consumer input from the data entry device 125. This can be done through an interrupt generated by the data entry device or the other task processes 1710 can periodically test the data entry device interface.

When there is consumer input, step 1707 generates or updates various displays such as those of FIG. 15 and FIG. 16 described in the foregoing. Those ordinarily skilled in the art of programming interactive displays can produce the design and processing for such various displays. The examples of FIG. 15 and FIG. 16 should not be construed in a way that limits the present invention.

The forgoing describes measuring and storing more electrical parameters than used to provide the described functions. A variety of additional useful information can be extracted from the stored data set. As one example, it is well known that the electrical characteristic of electric motors change as they wear. Likewise the power needed by mechanical equipment driven by motors also changes over time. For example, the power consumed by an air conditioner can depend on its refrigerant charge, condition of its compressor, and the airflow through is two heat exchangers. However, other factors such as the outside temperature and the time of continuous operation can also affect the power. After adjusting for these affects, long term changes in the power information contained in the instance structures associated with the air conditioner can be attributed to physical changes in the air conditioner. Since most of these changes reduce efficiency, early detection and maintenance or repair can prevent significant wasted energy.

As another example, the power distribution circuits within a home have multiple splices and connections that may deteriorate over time, increasing the resistance in the electrical path supplying power to devices. This resistance can make the connection get hot with high load and cause a fire. This problem can be detected in some cases if two or more devices receive power through the same connection and there are instance structures that represent times when each device operates individually and operates at the same time. If the first device is on, the voltage available to the second device is reduced, so its instance structure will depend on the on-off state of the first device. Searching for correlated changes in the instance structures can is some cases identify a faulty connection in a distribution circuit in the home.

As another example, a high power device will reduce the supply voltage which is measured directly. This voltage drop can be used to determine the impedance of the electrical service to the home. Difference in impedance between the two legs and/or changes over time can alert the homeowner to potential problem with the electrical service before it fails or causes a fire.

The forgoing examples are only illustrative of the information than may be extracted from the data set stored in data memory 123, and correlating the data with other events and conditions.

Conclusion

From the forgoing disclosure, it will be apparent that there has been provided an improved power monitoring system that uses only one set of current and voltage sensors to identify individual electrical devices served by a common AC supply. The invention also tracks the power usage of each of multiple devices and reports to the consumer the present status of these multiple devices, and the accumulated run time and cost for a specified period of time for each of multiple devices.

The various features illustrated in the figures may be combined in many ways, and should not be interpreted as though limited to the specific embodiments in which they were explained and shown. Those ordinarily skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A method comprising:
   identifying a data set generated based on sampling at legs of an alternating current service, the legs providing a common power supply a plurality of electrical devices;
   with a processor and a memory, identifying, based on said data set, a first instance data structure corresponding to a first on-off cycle of a first electrical device of the plurality of electrical devices, the first instance data structure including:
      first data characterizing a start section of the first on-off cycle;
      second data characterizing a middle section of the first on-off cycle; and
      third data characterizing an end section of the first on-off cycle;
   based on the identifying the first instance data structure, subtracting from the data set a contribution by the first on-off cycle, wherein the subtracting the contribution results in a residual data set; and
   determining whether the residual data set includes a contribution by any on-off cycle of another electrical device of the plurality of electrical devices, wherein the first on-off cycle and the any on-off cycle each start with a respective step change event of a corresponding electrical device and ends with a respective step change event of the corresponding electrical device.

2. The method of claim 1 wherein identifying the first instance structure includes identifying an indication in the data set of a step change event of the first electrical device.

3. The method of claim 2, further comprising iteratively performing operations each to subtract a contribution by a respective on-off cycle of the plurality of electrical devices.

4. The method of claim 1, further comprising decomposing an instance data structure into two instance data structures.

5. The method of claim 1 wherein identifying the first instance data structure is based on a match error between the first instance data structure and a device structure, said match error indicating an association of said first instance data structure with said device structure.

6. The method of claim 5, further comprising consolidating the first instance data structure with the device structure based on a measurement confidence parameter of the first instance structure.

7. The method of claim 1, wherein the data set includes a plurality of reports generated approximately once per alternating current cycle of the alternating current service, the plurality of reports each including multiple respective electrical parameters, wherein each of the respective multiple respective electrical parameters is based on a respective plurality of sample values.

8. The method of claim 1, further comprising identifying a composite structure characterizing behavior of multiple electrical devices of the plurality of electrical devices.

9. A non-transitory computer-readable storage medium having stored thereon instructions which, when executed by one or more processors, cause the one or more processors to perform a method comprising:
   identifying a data set generated based on sampling at legs of an alternating current service, the legs providing a common power supply for a plurality of electrical devices;
   identifying, based on said data set, a first instance data structure corresponding to a first on-off cycle of a first electrical device of the plurality of electrical devices, the first instance data structure including:
      first data characterizing a start section of the first on-off cycle;
      second data characterizing a middle section of the first on-off cycle; and
      third data characterizing an end section of the first on-off cycle;
   based on the identifying the first instance data structure, subtracting from the data set a contribution by the first on-off cycle, wherein the subtracting the contribution results in a residual data set; and
   determining whether the residual data set includes a contribution by any on-off cycle of another electrical device of the plurality of electrical devices, wherein the first on-off cycle and the any on-off cycle each start with a respective step change event of a corresponding electrical device and ends with a respective step change event of the corresponding electrical device.

10. The non-transitory computer-readable storage medium of claim 9 wherein identifying the first instance structure includes identifying an indication in the data set of a step change event of the first electrical device.

11. The non-transitory computer-readable storage medium of claim 10, the method further comprising iteratively performing operations each to subtract a contribution by a respective on-off cycle of the plurality of electrical devices.

12. The non-transitory computer-readable storage medium of claim 9, the method further comprising decomposing an instance data structure into two instance data structures.

13. The non-transitory computer-readable storage medium of claim 9 wherein identifying the first instance data structure is based on a match error between the first instance data structure and a device structure, said match error indicating an association of said first instance data structure with said device structure.

14. The non-transitory computer-readable storage medium of claim 9, the method further comprising consolidating the first instance data structure with the device structure based on a measurement confidence parameter of the first instance structure.

15. The non-transitory computer-readable storage medium of claim 9, wherein the data set includes a plurality of reports generated approximately once per alternating current cycle of the alternating current service, the plurality of reports each including multiple respective electrical parameters, wherein each of the respective multiple respective electrical parameters is based on a respective plurality of sample values.

16. The non-transitory computer-readable storage medium of claim 9, the method further comprising identifying a composite structure characterizing behavior of multiple electrical devices of the plurality of electrical devices.

* * * * *